(12) United States Patent
Katayama et al.

(10) Patent No.: US 8,405,957 B2
(45) Date of Patent: Mar. 26, 2013

(54) SEPARATOR FOR ELECTROCHEMICAL DEVICE AND METHOD FOR PRODUCING THE SAME, AND ELECTROCHEMICAL DEVICE AND METHOD FOR PRODUCING THE SAME

(75) Inventors: Hideaki Katayama, Osaka (JP); Toshihiro Abe, Osaka (JP); Nobuaki Matsumoto, Osaka (JP); Yoshinori Sato, Osaka (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 730 days.

(21) Appl. No.: 11/919,652

(22) PCT Filed: Dec. 8, 2006

(86) PCT No.: PCT/JP2006/324581
§ 371 (c)(1),
(2), (4) Date: Oct. 31, 2007

(87) PCT Pub. No.: WO2007/066768
PCT Pub. Date: Jun. 14, 2007

(65) Prior Publication Data
US 2009/0067119 A1 Mar. 12, 2009

(30) Foreign Application Priority Data
Dec. 8, 2005 (WO) .................. PCT/JP2005/022540

(51) Int. Cl.
*H01G 9/02* (2006.01)
(52) U.S. Cl. ........ 361/512; 361/502; 361/503; 29/25.03
(58) Field of Classification Search .................. 361/512, 361/503, 502, 511; 29/25.03
See application file for complete search history.

(56) References Cited

U.S. PATENT DOCUMENTS

| | | | |
|---|---|---|---|
| 4,741,979 A | 5/1988 | Faust et al. | |
| 6,153,337 A | 11/2000 | Carlson et al. | |
| 6,200,706 B1 | 3/2001 | Ashida et al. | |
| 6,287,720 B1 | 9/2001 | Yamashita et al. | |
| 6,387,565 B1 | 5/2002 | Aihara et al. | |
| 6,432,586 B1 | 8/2002 | Zhang | |
| 6,447,958 B1 | 9/2002 | Shinohara et al. | |
| 6,627,346 B1 * | 9/2003 | Kinouchi et al. | 429/144 |
| 6,632,561 B1 | 10/2003 | Bauer et al. | |
| 6,723,467 B2 | 4/2004 | Yoshida et al. | |
| 6,811,928 B2 | 11/2004 | Aihara et al. | |
| 7,662,517 B2 | 2/2010 | Lee et al. | |
| 2003/0036002 A1 | 2/2003 | Yoshida et al. | |
| 2003/0087158 A1 | 5/2003 | Nakagawa et al. | |
| 2003/0129379 A1 | 7/2003 | Yao et al. | |
| 2004/0166297 A1 | 8/2004 | Yao et al. | |
| 2004/0244675 A1 | 12/2004 | Kishimoto et al. | |
| 2005/0031942 A1 | 2/2005 | Hennige et al. | |
| 2005/0186479 A1 | 8/2005 | Totsuka et al. | |
| 2005/0208383 A1 | 9/2005 | Totsuka et al. | |
| 2005/0221165 A1 | 10/2005 | Hennige et al. | |
| 2006/0078791 A1 | 4/2006 | Hennige et al. | |
| 2006/0134526 A1 | 6/2006 | Han et al. | |
| 2006/0263693 A1 | 11/2006 | Kim et al. | |
| 2006/0286446 A1 | 12/2006 | Chun et al. | |
| 2007/0264577 A1 | 11/2007 | Katayama et al. | |
| 2008/0138700 A1 | 6/2008 | Horpel et al. | |
| 2008/0248381 A1 | 10/2008 | Hennige et al. | |
| 2010/0015530 A1 | 1/2010 | Katayama et al. | |
| 2011/0003209 A1 | 1/2011 | Katayama et al. | |

FOREIGN PATENT DOCUMENTS

| | | |
|---|---|---|
| EP | 1184917 A2 | 3/2002 |
| EP | 1359632 A2 | 11/2003 |
| JP | 60-136161 | 7/1985 |
| JP | 1-258358 A | 10/1989 |
| JP | 2-86056 A | 3/1990 |
| JP | 4-340972 A | 11/1992 |
| JP | 5-074436 | 3/1993 |
| JP | 5335005 A | 12/1993 |
| JP | 8-287949 A | 11/1996 |
| JP | 9-134028 A | 5/1997 |
| JP | 9-259856 A | 10/1997 |
| JP | 11-040130 | 2/1999 |
| JP | 11-185773 A | 7/1999 |
| JP | 11-260338 A | 9/1999 |
| JP | 2000-30686 A | 1/2000 |
| JP | 2000-48639 A | 2/2000 |
| JP | 2000-306568 A | 11/2000 |
| JP | 2000-348704 A1 | 12/2000 |
| JP | 2001-84987 A | 3/2001 |
| JP | 2001-93498 A | 4/2001 |
| JP | 2001-135295 A | 5/2001 |
| JP | 2001-266828 A | 9/2001 |

(Continued)

OTHER PUBLICATIONS

Boehmite Mineral Data, Excalibur Mineral Company.
US Office Action, dated Apr. 6, 2011, for U.S. Appl. No. 11/666,921.
English language machine generated translation of JP-2003-7279-A.
US Office Action, dated Sep. 20, 2010, for U.S. Appl. No. 11/666,921.
Extended European Search Report, dated Feb. 21, 2012, for European Application No. 05814154.0.
Japanese Office Action, dated Sep. 13, 2012, for Japanese Application No. 2008-124988.
Japanese Office Action dated Jul. 5, 2012, for Japanese Patent Application No. 2007-214272.

*Primary Examiner* — Eric Thomas
(74) *Attorney, Agent, or Firm* — Birch, Stewart, Kolasch & Birch, LLP

(57) ABSTRACT

An electrochemical device having excellent safety at a high temperature is provided by using a separator for an electrochemical device, which is made of a porous film including a first separator layer and a second separator layer. The first separator layer includes, as a main ingredient, at least one kind of resin selected from the group consisting of resin A that has a melting point in a range of 80° C. to 130° C., and resin B that absorbs a nonaqueous electrolyte and swells due to heating and whose swelling degree is increased as the temperature rises, the second separator layer includes, as a main ingredient, a filler that has a heat-resistant temperature of not lower than 150° C., and at least one of the first separator layer and the second separator layer includes flakes.

41 Claims, 2 Drawing Sheets

FOREIGN PATENT DOCUMENTS

| | | | |
|---|---|---|---|
| JP | 2001-291503 A | 10/2001 |
| JP | 2001-527274 A | 12/2001 |
| JP | 2002-25531 A | 1/2002 |
| JP | 2002-042867 | 2/2002 |
| JP | 2002-151040 A | 5/2002 |
| JP | 2002-166218 A | 6/2002 |
| JP | 2002-237332 A | 8/2002 |
| JP | 2002-541633 A | 12/2002 |
| JP | 2003-7279 A | 1/2003 |
| JP | 2003-22843 | 1/2003 |
| JP | 2003-123728 A | 4/2003 |
| JP | 2003-206475 A | 7/2003 |
| JP | 2003-208924 A | 7/2003 |
| JP | 2003-317693 A | 11/2003 |
| JP | 2004-14127 A | 1/2004 |
| JP | 2004-111157 A | 4/2004 |
| JP | 2004-241135 A | 8/2004 |
| JP | 2004-273282 | 9/2004 |
| JP | 2004-288586 A | 10/2004 |
| JP | 2005-502177 | 1/2005 |
| JP | 2005-302341 A | 10/2005 |
| JP | 2005-327633 A | 11/2005 |
| JP | 2005-339938 A | 12/2005 |
| JP | 2005-536858 | 12/2005 |
| JP | 2007-5158 A | 1/2007 |
| JP | 2007-125821 A | 5/2007 |
| JP | 2007-149507 A | 6/2007 |
| JP | 2007-273443 A | 10/2007 |
| KR | 10-0470314 B1 | 12/2004 |
| WO | WO-00/60684 A1 | 10/2000 |
| WO | WO 2004/049471 A2 | 6/2004 |
| WO | WO 2005/038946 A2 | 4/2005 |
| WO | WO 2005/104269 A1 | 11/2005 |
| WO | WO 2006/062153 A1 | 6/2006 |
| WO | WO 2006068428 A1 * | 6/2006 |

* cited by examiner

SEPARATOR FOR ELECTROCHEMICAL DEVICE AND METHOD FOR PRODUCING THE SAME, AND ELECTROCHEMICAL DEVICE AND METHOD FOR PRODUCING THE SAME

TECHNICAL FIELD

The present invention relates to a separator for an electrochemical device provided at a low cost and having excellent dimensional stability at a high temperature, and also an electrochemical device using the separator and being safe even in a high-temperature environment.

BACKGROUND ART

Electrochemical devices using nonaqueous electrolytes, represented by a lithium secondary battery and a supercapacitor, have been used widely as power sources for portable equipment such as mobile phones and notebook-sized personal computers because of the characteristic of high energy density. With improvement in the performance of the portable equipment, the capacity of the electrochemical devices tends to become higher, and thus securing safety has become important.

In a current-technology lithium secondary battery, a polyolefin-based porous film having a thickness of 20 to 30 µm is used as a separator to be interposed between a positive electrode and a negative electrode, for example. For the material of the separator, polyethylene (PE) having a low melting point may be used for securing a so-called shutdown effect, namely, melting a resin as an ingredient of the separator at or below a thermal runaway (abnormal heating) temperature of the battery so as to close the pores, thereby increasing the internal impedance of the battery and improving the safety of the battery at the time of a short-circuit or the like.

For the separator, for example, a uniaxially- or biaxially-stretched film is used in order to provide porosity and improve the strength. Since such a separator is provided as a film to exist alone, a certain strength is required in view of workability or the like, which is secured by the above-mentioned stretching. However, since crystallinity of the stretched film is increased, and the shutdown temperature is raised up to approximately the thermal runaway temperature of the battery, the margin for securing the safety of the battery cannot be provided sufficiently.

Moreover, distortion occurs in the film due to the stretching, and thus when exposed to a high temperature, shrinkage will occur due to residual stress. The shrinking temperature is extremely close to the melting point, that is, the shutdown temperature. As a result, in the case of using a polyolefin-based porous film separator, when the temperature of the battery reaches the shutdown temperature during anomalies in charging or the like, the current must be decreased immediately for preventing the battery temperature from rising. If the pores are not closed sufficiently and the current cannot be decreased immediately, the battery temperature will be raised easily to the shrinking temperature of the separator, causing a risk of abnormal heating due to an internal short-circuit.

In order to prevent a short-circuit caused by such thermal shrinkage, methods of using separators of a microporous film or a nonwoven fabric using a heat-resistant resin have been proposed. For example, Patent document 1 discloses a separator using a microporous film of wholly aromatic polyamide, and Patent document 2 discloses a separator using a polyimide porous film. Patent document 3 discloses a separator using a polyamide nonwoven fabric, Patent document 4 discloses a separator including a base of a nonwoven fabric using aramid fibers, Patent document 5 discloses a separator using a polypropylene (PP) nonwoven fabric, and Patent document 6 discloses a separator using a polyester nonwoven fabric.

Though each of the above-mentioned separators made of a heat-resistant resin or heat-resistant fibers has excellent dimensional stability at a high temperature and can be made thinner, it does not have the so-called shutdown characteristic, namely, a characteristic that the pores will be closed at a high temperature, and thus the separator cannot provide sufficient safety at an abnormality, specifically when the battery temperature rises rapidly due to an external short-circuit or an internal short-circuit.

As a method for solving such problems, Patent documents 7 and 8 show separators including a base of a nonwoven fabric, in which thermoplastic polyolefin is contained. Such separators indeed cause no thermal shrinkage at a high temperature, and show the shutdown characteristic with polyolefin melted at its melting point or higher. However, studies of the present inventors have shown that the above-described separators have a problem in securing the reliability of a battery for the following reason. That is, in the case where a positive electrode containing an active material of inorganic oxide particles, which usually are used for a positive electrode of a lithium battery, is used together to provide a battery, for example, due to the flexible polyolefin and the very hard inorganic oxide particles, when the positive electrode and a negative electrode are pressed against each other via the separator, protrusions of the inorganic oxide particles of the positive electrode may penetrate the separator to be in contact with the negative electrode, resulting in the possibility of a short-circuit.

Patent documents 9 and 10 propose methods of forming a separator that contains an inorganic filler in a nonwoven fabric in order to prevent the short-circuit as described above. However, such a separator is not provided with the shutdown function, and thus has a problem in securing safety. Further, in the examples shown in Patent documents 9 and 10, mere granular fine particles are used for the inorganic filler. However, according to studies of the present inventors, when lithium dendrite is formed, the dendrite is likely to penetrate a porous film formed of granular inorganic fine particles, and thus the reliability with respect to an internal short-circuit caused by the dendrite cannot be secured sufficiently.

Further, in the example shown in Patent document 9, a binder for binding the inorganic filler is not used, while an inorganic binder is used in the example shown in Patent document 10. Such separators have no problem when used without being bent. However, when a positive electrode, a negative electrode, and the separator are wound spirally to form a wound body, which generally is used for a lithium battery, the separator formed of the inorganic filler easily cracks, which may cause a short-circuit. Especially, in the case of a rectangular battery using a wound body having a bent portion of a small diameter, the problem of a short-circuit caused by a crack of the separator is notable.

In addition, Patent document 11 shows a separator in which a shutdown layer formed of polyolefin particles is provided on a porous film formed of a nonwoven fabric and an inorganic filler, thereby securing the shutdown function. With this constitution, it is possible to provide the shutdown function while securing heat resistance of the separator. However, since the porous film as a base formed of a nonwoven fabric and an inorganic filler has the same constitution as that shown in Patent document 10, the above-described problems, that is, resistance to an internal short-circuit caused by the dendrite and the reliability with respect to bending, remain to be solved.

Patent document 1: JP H05-335005 A
Patent document 2: JP 2000-306568 A
Patent document 3: JP H09-259856 A
Patent document 4: JP H11-40130 A
Patent document 5: JP 2001-291503 A
Patent document 6: JP 2003-123728 A
Patent document 7: JP S60-136161 A
Patent document 8: JP H05-74436 A
Patent document 9: JP 2003-22843 A
Patent document 10: JP 2005-502177 A
Patent document 11: JP 2005-536858 A With the foregoing in mind, it is an object of the present invention to provide a separator that can form an electrochemical device with excellent safety at the time of abnormal heating and reliability with respect to an internal short-circuit caused by various causes and a method for producing the same, and an electrochemical device including the separator and a method for producing the same.

DISCLOSURE OF INVENTION

A separator for an electrochemical device according to the present invention includes a porous first separator layer and a porous second separator layer. The first separator layer includes, as a main ingredient, at least one kind of resin selected from the group consisting of resin A that has a melting point in a range of 80° C. to 130° C., and resin B that absorbs a nonaqueous electrolyte and swells due to heating and whose swelling degree is increased as the temperature rises, the second separator layer includes, as a main ingredient, a filler that has a heat-resistant temperature of not lower than 150° C., and at least one of the first separator layer and the second separator layer includes flakes.

An electrochemical device according to the present invention includes a positive electrode, a negative electrode, a nonaqueous electrolyte, and a porous separator. The separator includes a first separator layer and a second separator layer, the first separator layer includes, as a main ingredient, at least one kind of resin selected from the group consisting of resin A that has a melting point in a range of 80° C. to 130° C., and resin B that absorbs the nonaqueous electrolyte and swells due to heating and whose swelling degree is increased as the temperature rises, the second separator layer includes, as a main ingredient, a filler that has a heat-resistant temperature of not lower than 150° C., and at least one of the first separator layer and the second separator layer includes flakes.

A first method for producing the separator for an electrochemical device according to the present invention includes the steps of preparing a composition in a slurry state for forming a first separator layer that includes at least one kind of resin selected from the group consisting of resin A that has a melting point in a range of 80° C. to 130° C., and resin B that absorbs a nonaqueous electrolyte and swells due to heating and whose swelling degree is increased as the temperature rises; preparing a composition in a slurry state for forming a second separator layer that includes a filler that has a heat-resistant temperature of not lower than 150° C.; applying the composition for forming the first separator layer on a porous base so as to form the first separator layer that includes, as a main ingredient, at least one kind of resin selected from the group consisting of the resin A and the resin B; and applying the composition for forming the second separator layer on the porous base so as to form the second separator layer that includes, as a main ingredient, the filler. At least one of the composition for forming the first separator layer and the composition for forming the second separator layer includes flakes.

A second method for producing the separator for an electrochemical device according to the present invention includes the steps of preparing a composition in a slurry state for forming a first separator layer that includes at least one kind of resin selected from the group consisting of resin A that has a melting point in a range of 80° C. to 130° C., and resin B that absorbs a nonaqueous electrolyte and swells due to heating and whose swelling degree is increased as the temperature rises; preparing a composition in a slurry state for forming a second separator layer that includes a filler that has a heat-resistant temperature of not lower than 150° C.; applying the composition for forming the first separator layer on a first porous base so as to form the first separator layer that includes, as a main ingredient, at least one kind of resin selected from the group consisting of the resin A and the resin B; and applying the composition for forming the second separator layer on a second porous base so as to form the second separator layer that includes, as a main ingredient, the filler. At least one of the composition for forming the first separator layer and the composition for forming the second separator layer includes flakes.

A method for producing the electrochemical device according to the present invention includes the steps of: preparing a composition in a slurry state for forming a first separator layer that includes at least one kind of resin selected from the group consisting of resin A that has a melting point in a range of 80° C. to 130° C., and resin B that absorbs a nonaqueous electrolyte and swells due to heating and whose swelling degree is increased as the temperature rises; preparing a composition in a slurry state for forming a second separator layer that includes a filler that has a heat-resistant temperature of not lower than 150° C.; preparing a composition for forming an active material-containing layer; and applying the composition for forming the active material-containing layer on a current collector, and applying the composition for forming the first separator layer or the composition for forming the second separator layer before the applied composition for forming the active material-containing layer is dried, thereby forming the first separator layer that includes, as a main ingredient, at least one kind of resin selected from the group consisting of the resin A and the resin B or the second separator layer that includes, as a main ingredient, the filler. At least one of the composition for forming the first separator layer and the composition for forming the second separator layer includes flakes.

According to the present invention, an electrochemical device, which is excellent in reliability with respect to an internal short-circuit caused by various causes and in safety when the battery temperature rises abnormally due to a short-circuit or overcharge, can be provided.

DESCRIPTION OF THE INVENTION

Figure 1:
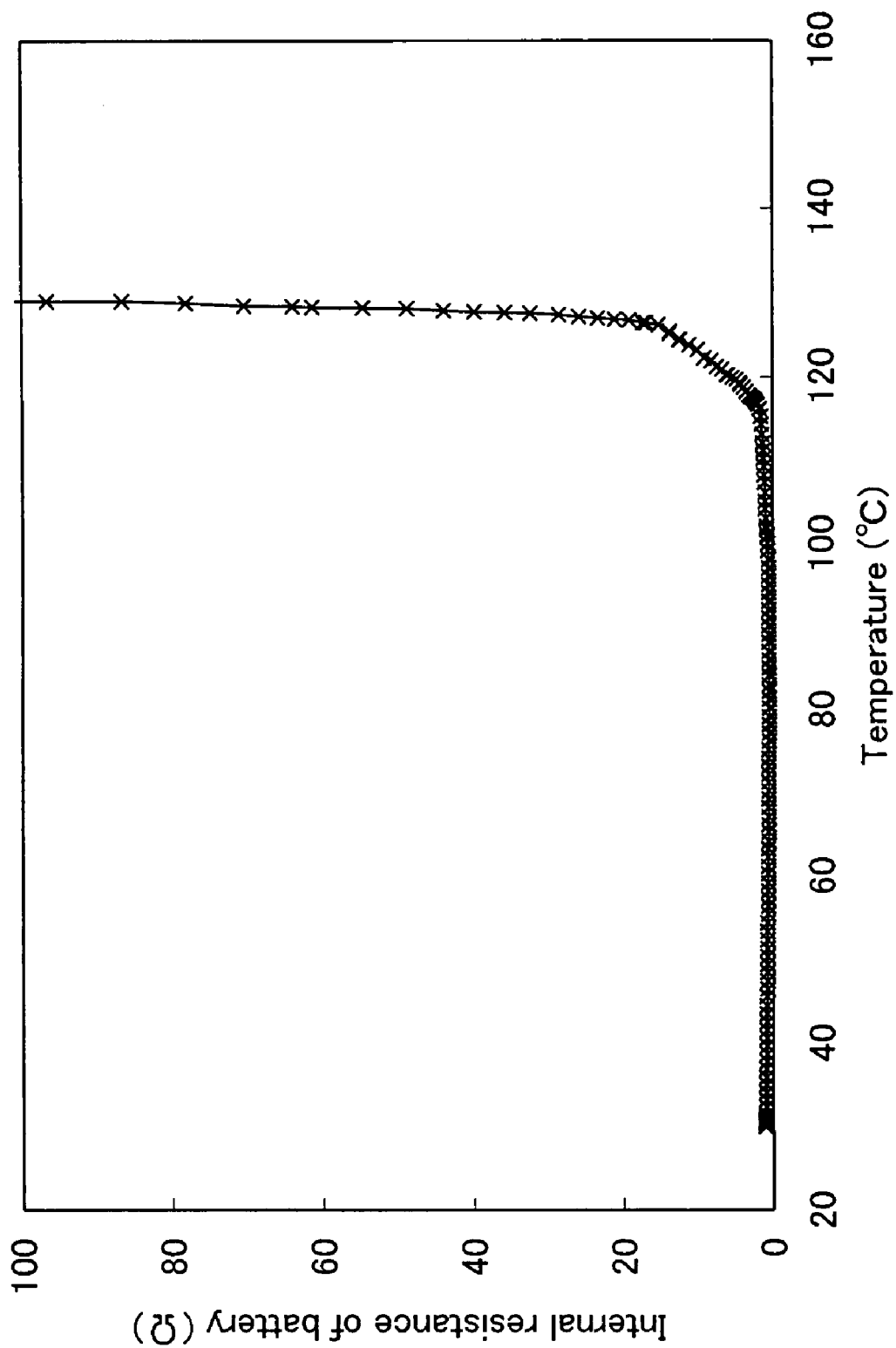
FIG. 1 is a graph showing the internal impedance that changes according to the temperature in a lithium secondary battery in Example 3.

A separator for an electrochemical device (hereinafter, merely referred to as a "separator") according to the present invention is a porous film including a porous first separator layer and a porous second separator layer. The first separator layer includes, as a main ingredient, at least one kind of resin selected from the group consisting of resin A that has a melting point in a range of 80° C. to 130° C., and resin B that absorbs a nonaqueous electrolyte (hereinafter, this merely may be referred to as an "electrolyte") and swells due to heating and whose swelling degree is increased as the temperature rises (hereinafter, this merely may be referred to as "resin A and/or resin B"). The second separator layer includes, as a main ingredient, a filler that has a heat-resistant temperature of not lower than 150° C. At least one of the first separator layer and the second separator layer includes flakes.

The first separator layer in the separator of the present invention is provided to secure the shutdown function. In the case where the first separator layer includes the resin A, when the temperature of the electrochemical device in which the separator of the present invention is incorporated reaches the melting point or higher of the resin A, a shutdown occurs, namely, the resin A is melted to close the pores of the separator so as to suppress the progress in the electrochemical reaction. On the other hand, in the case where the first separator layer includes the resin B, the resin B absorbs the electrolyte in the electrochemical device and swells as the temperature of the electrochemical device in which the separator of the present invention is incorporated rises, and the swollen particles close the pores of the separator and at the same time, a liquid electrolyte present in the pores of the separator decreases to cause a shutdown. According to the separator of the present invention, in the case where the first separator layer includes the resin A, the resin A melted on a surface of the separator may form a film to inhibit the conduction of the Li ion, thereby causing a shutdown, instead of closing the pores of the separator to cause a shutdown. It is thought that this shutdown mechanism is likely to occur in the case where the first separator layer including the resin A is present on the surface of the separator and the ratio of the resin A on the surface of the separator by volume is high. In this case, the response speed of a shutdown is expected to be higher than in the case where a shutdown occurs by closing the pores of the separator.

The second separator layer in the separator of the present invention has an original function of the separator, i.e., a function of preventing a short-circuit caused mainly by direct contact between the positive electrode and the negative electrode, and this function is secured by the filler that has a heat-resistant temperature of not lower than 150° C. More specifically, when the positive electrode and the negative electrode are pressed against each other via the separator to form an electrode, for example, the second separator layer can prevent a short-circuit caused by a positive active material penetrating the separator to be in contact with the negative electrode in an ordinary use temperature range for the electrochemical device. Further, in the case of a temperature rise of the electrochemical device, the second separator layer suppresses thermal shrinkage of the separator, and the shape of the separator can be retained, and thus a short-circuit caused by direct contact between the positive electrode and the negative electrode, which may occur due to thermal shrinkage of the separator, can be prevented. Here, in this specification, "heat-resistant temperature of not lower than 150° C." means that no deformation such as softening is caused at least 150° C., except for the case of the porous base described below. There is no particular limitation on the upper limit of the heat-resistant temperature.

Regarding the separator of the present invention, at least one of the first separator layer and the second separator layer includes flakes. When at least one of the first separator layer and the second separator layer includes flakes, the length of a path between the positive electrode and the negative electrode in the separator, i.e., a so-called tortuosity factor, is increased. Therefore, in the electrochemical device using the separator of the present invention, even when dendrite is formed, it becomes difficult for the dendrite to reach the positive electrode from the negative electrode, and thus the reliability with respect to an internal short-circuit caused by the dendrite can be improved. In the case where the second separator layer includes flakes, the flakes also can serve as a "filler that has a heat-resistant temperature of not lower than 150° C.", and thus at least a part of the filler included in the second separator layer can be formed of the flakes.

In this specification, "includes, as a main ingredient, resin A and/or resin B" regarding the first separator layer means that the solid content (in the case of using the porous base described below, the solid content except this porous base) of the resin A and/or the resin B in the layer is not less than 50 vol. %. Further, in this specification, "includes, as a main ingredient, a filler that has a heat-resistant temperature of not lower than 150° C." regarding the second separator layer means that the solid content (in the case of using the porous base described below, the solid content except this porous base) of the filler that has a heat-resistant temperature of not lower than 150° C. in the layer is not less than 50 vol. %.

The resin A in the first separator layer has a melting point in a range of 80° C. to 130° C. The melting point of the resin A can be determined, for example, on the basis of a melting temperature measured by using a differential scanning calorimeter (DSC) according to the regulations of Japanese Industrial Standards (JIS) K 7121.

It is preferable that the resin A is formed of an electrochemically-stable material that is electrically insulative, stable with respect to the electrolyte of the electrochemical device, and furthermore resistant against oxidation/reduction in an operation voltage range for the electrochemical device. Specific examples include polyethylene (PE), copolymer polyolefin or a polyolefin derivative (such as chlorinated polyethylene), a polyolefin wax, a petroleum wax, and a carnauba wax. Examples of the copolymer polyolefin include an ethylene-vinyl monomer copolymer, or more specifically, an ethylene-vinyl acetate copolymer (EVA) or ethylene acrylate copolymers such as an ethylene-methylacrylate copolymer and an ethylene-ethylacrylate copolymer. It is preferable that the structural unit derived from ethylene in the copolymer polyolefin is at least 85 mol %. Alternatively, polycycloolefin or the like can be used. One of the above-mentioned resins can be used alone, or alternatively two or more of the resins can be used for the resin A.

Among the above-mentioned materials, PE, a polyolefin wax, or EVA having at least 85 mol % of a structural unit derived from ethylene is used preferably for the resin A. The resin A can contain various additives such as an antioxidant to be added generally to a resin as required.

A resin used for the resin B in the first separator layer absorbs no or a restricted amount of electrolyte in an ordinary use temperature range (about 70° C. or lower) for the electrochemical device, and thus the resin has a swelling degree of not more than a certain level. However, when heated to a temperature that requires a shutdown, the resin will absorb the electrolyte and swell considerably, and the swelling degree will be increased as the temperature rises. In the electrochemical device using the separator that includes the resin B in the first separator layer, when the temperature is lower than the shutdown temperature, a liquid electrolyte not being absorbed by the resin B exists in the pores of the separator.

Therefore, the conductivity of the Li (lithium) ion in the separator is increased to provide an electrochemical device with a preferable load performance. When the resin is heated to a temperature of not lower than the temperature at which a characteristic of increasing the swelling degree as the temperature rises (hereinafter, this may be referred to as a "thermal swelling characteristic") appears, the resin B absorbs the electrolyte in the electrochemical device and swells considerably. The swollen resin B closes the pores of the separator and at the same time, the liquid electrolyte is decreased to cause lack of solution in the electrochemical device, so that a shutdown occurs to secure the safety of the electrochemical device. Moreover, when the temperature rises up to exceed the shutdown temperature, the lack of solution proceeds further due to the thermal swelling characteristic, and the reaction of the electrochemical device is suppressed further. Thereby, the safety with respect to a high temperature after the shutdown can be improved further.

It is preferable that the temperature at which the resin B starts exhibiting the thermal swelling characteristic is 75° C. or higher. By setting the temperature at which the resin B starts exhibiting the thermal swelling characteristic to 75° C. or higher, it is possible to set a so-called shutdown temperature to be about 80° C. or higher. The shutdown temperature denotes a temperature at which the conductivity of the Li ion decreases considerably and the internal impedance of the battery increases. If the lower limit of the temperature for exhibiting the thermal swelling characteristic becomes higher, the shutdown temperature of the separator will be higher. Therefore, for setting the shutdown temperature to about 130° C. or lower, the temperature at which the resin B starts exhibiting the thermal swelling characteristic is set to be 125° C. or lower preferably, and more preferably 115° C. or lower. When the temperature for exhibiting the thermal swelling characteristic is excessively high, there is a risk that the thermal runaway reaction of the active material in the battery cannot be suppressed sufficiently, and the effect of improving the safety of the electrochemical device cannot be secured sufficiently. When the temperature for exhibiting the thermal swelling characteristic is excessively low, the conductivity of the Li ion may be lowered excessively in an ordinary use temperature range (about 70° C. or lower) for the electrochemical device.

It is preferable that absorption of the electrolyte by the resin B is suppressed as much as possible and the resin B swells less at a temperature lower than the temperature for exhibiting the thermal swelling characteristic. This is because in a use temperature range for the electrochemical device, or at room temperature for example, the characteristics of the electrochemical device such as the load performance can be improved when the electrolyte is not absorbed by the resin B but held in a liquid state in the pores of the separator.

The volume of the electrolyte absorbed by the resin B at room temperature (25° C.) can be evaluated based on the swelling degree $B_R$ defined with the following Equation (1) expressing a volume change of the resin B.

$$B_R=(V_0/V_i)-1 \qquad (1)$$

In the equation, $V_0$ denotes the volume (cm$^3$) of the resin B after being dipped in the electrolyte at 25° C. for 24 hours, and $V_i$ denotes the volume (cm$^3$) of the resin B before being dipped in the electrolyte.

For the separator of the present invention, it is preferable that the swelling degree $B_R$ of the resin B at room temperature (25° C.) is not more than 1. It is preferable that swelling due to absorption of the electrolyte is small, namely, $B_R$ is as small as to approximate to zero. It is also preferable that at a temperature lower than the temperature for exhibiting the thermal swelling characteristic, a change in the swelling degree according to the temperature is suppressed as much as possible. For a separator to which the resin B is bonded by a binder resin, the resin B coexisting with the binder resin preferably has a small swelling degree.

Regarding the resin B in use, absorption of the electrolyte is increased when the resin B is heated over the lower limit of the temperature for exhibiting the thermal swelling characteristic, and the swelling degree is increased as the temperature rises in a range of temperature for exhibiting the thermal swelling characteristic. In a preferred example, the swelling degree $B_T$ defined with the following Equation (2) is at least 1 in a measurement at 120° C.

$$B_T=(V_1/V_0)-1 \qquad (2)$$

In the equation, $V_0$ denotes the volume (cm$^3$) of the resin B after being dipped in the electrolyte at 25° C. for 24 hours, and $V_1$ denotes the volume (cm$^3$) of the resin B after being dipped in the electrolyte at 25° C. for 24 hours, followed by steps of raising the temperature of the electrolyte to 120° C. and keeping the temperature at 120° C. for one hour.

When the swelling degree of the resin B as defined with Equation (2) is increased excessively, the electrochemical device (such as a battery) may be deformed. Therefore, the swelling degree is not more than 10 preferably.

The swelling degree as defined by Equation (2) can be estimated by directly measuring a change in size of the resin B through a measurement such as a light-scattering method and an analysis of images taken by a CCD camera or the like. The swelling degree can be measured more accurately by the following method, for example.

A binder resin whose swelling degrees at 25° C. and at 120° C. have been known by the same definitions as in Equations (1) and (2) above is used as a solution or an emulsion. The resin B is mixed in the solution or the emulsion so as to prepare a slurry. The slurry is then applied on a base such as a polyethylene terephthalate (PET) sheet or a glass sheet to make a film, and the mass of the film is measured. Next, this film is dipped in a 25° C. electrolyte for 24 hours, and the mass is measured. Further, the electrolyte is heated to 120° C. The electrolyte is kept at 120° C. for one hour to measure the mass of the film, and the swelling degree $B_T$ is calculated on the basis of the following Equations (3) to (9). It should be noted that at the time of raising temperature from 25° C. to 120° C., increases in the volumes of ingredients other than the electrolyte are negligible in the following Equations (3) to (9).

$$V_i=M_i \times W/P_A \qquad (3)$$

$$V_B=(M_0-M_i)/P_B \qquad (4)$$

$$V_C=M_1/P_C-M_0/P_B \qquad (5)$$

$$V_V=M_i \times (1-W)/P_V \qquad (6)$$

$$V_0=V_i+V_B-V_V \times (B_B+1) \qquad (7)$$

$$V_D=V_V \times (B_B+1) \qquad (8)$$

$$B_T=\{V_0+V_C-V_D \times (B_C+1)\}/V_0-1 \qquad (9)$$

In Equations (3) to (9) above:

$V_i$: volume (cm$^3$) of resin B before being dipped in an electrolyte;

$V_0$: volume (cm$^3$) of resin B after being dipped in an electrolyte at 25° C. for 24 hours;

$V_B$: volume (cm³) of an electrolyte absorbed in a film after dipping the film in the electrolyte at room temperature for 24 hours;

$V_C$: volume (cm³) of an electrolyte absorbed in a film during a period in which, after dipping the film in the electrolyte at room temperature for 24 hours, the temperature of the electrolyte is raised up to 120° C. and further kept at 120° C. for one hour;

$V_V$: volume (cm³) of a binder resin before being dipped in an electrolyte;

$V_D$: volume (cm³) of a binder resin after being dipped in an electrolyte at room temperature for 24 hours;

$M_i$: mass (g) of a film before being dipped in an electrolyte;

$M_0$: mass (g) of a film after being dipped in an electrolyte at room temperature for 24 hours;

$M_1$: mass (g) of a film after being dipped in an electrolyte at room temperature for 24 hours, followed by steps of raising the temperature of the electrolyte up to 120° C. and further keeping the electrolyte at 120° C. for one hour;

W: mass percentage of resin B in a film before being dipped in an electrolyte;

$P_A$: specific gravity (g/cm³) of resin B before being dipped in an electrolyte;

$P_B$: specific gravity (g/cm³) of an electrolyte at room temperature;

$P_C$: specific gravity (g/cm³) of an electrolyte at a predetermined temperature;

$P_V$: specific gravity (g/cm³) of a binder resin before being dipped in an electrolyte;

$B_B$: swelling degree of a binder resin after being dipped in an electrolyte at room temperature for 24 hours; and $B_C$: swelling degree of a binder resin at the time of temperature rise as defined by Equation (2) above.

Further, the swelling degree $B_R$ at room temperature can be determined with Equation (1) on the basis of $V_i$ and $V_0$ determined by the above-described method with Equations (3) and (7) above.

The separator of the present invention is used for an electrochemical device with a nonaqueous electrolyte. In a conventional electrochemical device with a nonaqueous electrolyte, a solution prepared by dissolving lithium salt in an organic solvent, for example, is used for the nonaqueous electrolyte (details on the kind of the lithium salt and the organic solvent, the concentration of the lithium salt, and the like will be described later). It is recommended for the resin B that it starts exhibiting the thermal swelling characteristic at any temperature in a range of 75° C. to 125° C. in the organic solvent solution of lithium salt, and preferably can swell such that the swelling degrees $B_R$ and $B_T$ in the solution satisfy the above-described values.

The material used preferably for the resin B is electrochemically stable, namely it has both heat resistance and electric insulation, and the material is stable with respect to an electrolyte and resistant to oxidation/reduction in an operation voltage range for the electrochemical device. Examples of the material include a crosslinked resin, and more specifically, a crosslinked body of at least one resin selected from the group consisting of: styrene resins (such as polystyrene (PS)), styrene-butadiene rubbers (SBR), acrylic resins (such as polymethyl methacrylate (PMMA)), polyalkylene oxides (such as a polyethylene oxide (PEO)), fluorine resins (such as polyvinylidene fluoride (PVDF)) and a derivative thereof, urea resins; and polyurethane. One of these resins can be used alone, or alternatively at least two of the resins can be used together for the resin B. The resin B can contain various additives such as an antioxidant to be added generally to a resin as required.

Among the above-mentioned materials, crosslinked styrene resins, crosslinked acrylic resins, and crosslinked fluorine resins are preferred, and crosslinked PMMA is used particularly preferably for the resin B.

Although the mechanism by which such crosslinked resins absorb an electrolyte and swell as the temperature rises has not been clarified, it may relate to a glass transition point (Tg). That is, according to an estimate, since a typical resin is softened when heated to its Tg, the resin as described above has the capability of absorbing much electrolyte at or above Tg and swells. Therefore, a crosslinked resin used for the resin B is preferred to have its Tg in a range of 75° C. to 125° C. when considering that a temperature at which an actual shutdown action occurs will be a little higher than the temperature at which the resin B starts exhibiting the thermal swelling characteristic. In this specification, Tg of the crosslinked resin as the resin B is measured by using a DSC according to the regulations of JIS K 7121.

Before the above-described crosslinked resin contains an electrolyte, namely when the resin is in a so-called dry state, a volume change accompanying a temperature change has some reversibility. More specifically, even when the crosslinked resin swells due to a temperature rise, it shrinks again by lowering the temperature. Moreover, since the heat-resistant temperature of the crosslinked resin is higher considerably than the temperature for exhibiting the thermal swelling characteristic, it is possible to select a material that can be heated to 200° C. or higher even if the lower limit of the temperature for exhibiting the thermal swelling characteristic is about 100° C. Therefore, even if heat is applied in a step of producing a separator, for example, the resin will not be melted, or the thermal swelling characteristic of the resin will not be sacrificed, and the material can be handled in a simple manner in the production steps including an ordinary heating process.

There is no particular limitation on the form of the resin A and the resin B in use. They can be used in the form of fine particles. Alternatively, for example, the resin A or the resin B can be attached to the surface of a fibrous material, as a core, forming the porous base described below, or can coat the surface, thereby being contained in the first separator layer. Further, the resin A or the resin B can be contained in the first separator layer in the form of a core-shell structure, where a "filler that has a heat-resistant temperature of not lower than 150° C." in the second separator layer described below is the core and the resin A or the resin B is the shell. When both the resin A and the resin B are used, the resin A can be attached to the surface of the resin B or coat the surface of the resin B so as to be integrated with the resin B, for example. In this case, it is particularly preferable that the resin A and the resin B are used in the form of fine particles.

When fine particles are used for the resin A and the resin B, their sizes are not limited particularly as long as the particle diameters of these resins at drying are smaller than the thickness of the separator. Preferably, the average particle diameter is from 1/100 to 1/3 of the thickness of the separator. Specifically, it is preferable that the average particle diameters of the resin A and the resin B are in a range of 0.1 to 20 μm. When the particle diameters of the resin A and the resin B are too small, spacing between the particles will be decreased, and thus the length of the ion transport path may be increased to degrade the characteristics of the electrochemical device. When the particle diameter is too large, the thickness of the first separator layer is increased, and thus the energy density of the electrochemical device is decreased, which is not preferable. In this specification, the average particle diameter of the fine particles (the resin A, the resin B, the filler described below, the flakes described below) can be determined as a number-average particle diameter measured by using a laser scattering particle size distribution meter (such as "LA-920" manufactured by HORIBA), for example, in the following manner. That is, in the case of the resin A and the resin B, the fine particles are dispersed in a solvent (such as water) that will not swell these resins. In the case of the filler and the flakes described below, the fine particles are dispersed in a solvent that will not dissolve these particles.

The resin A and the resin B can be contained in the first separator layer alone respectively, or they can be used together.

It is preferable that the content of the resin A and the resin B in the separator is as follows, for example, for exhibiting the shutdown effect more easily. That is, the total volume of the resin A and the resin B is preferably not less than 10 vol. %, and more preferably not less than 20 vol. % of the entire volume of the whole ingredients of the separator. Further, the total volume of the resin A and the resin B is preferably not less than 50 vol. %, more preferably not less than 70 vol. %, and particularly preferably not less than 80 vol. % of the entire volume of the whole ingredients of the first separator layer (in the case of using the porous base described below, the entire volume of the whole ingredients except this porous base). Furthermore, it is preferable that the porosity of the second separator layer, which can be determined by the following method, is in a range of 10% to 50%, and the total volume of the resin A and the resin B is not less than 50 vol. % of the entire volume of the pores of the second separator layer. Since the resin A exhibits the shutdown effect by being melted to close the pores of the second separator layer at the time of heating, the volume of the resin A preferably is not less than a certain level with respect to the entire volume of the pores of the second separator layer. Since the resin B exhibits the shutdown effect by absorbing the electrolyte held in the separator and swelling to cause lack of solution at the time of heating, and the entire volume of the pores of the second separator layer is related to the amount of electrolyte to be used for the swelling of the resin B, the volume of the resin B preferably is not less than a certain level with respect to the entire volume of the pores of the second separator layer. There is no particular limitation on the upper limit of the total volume of the resin A and the resin B.

From the viewpoint of securing the shape stability of the separator at a high temperature, it is preferable that the total volume of the resin A and the resin B is not more than 80 vol. %, and more preferably not more than 40 vol. % of the entire volume of the whole ingredients of the separator.

The filler in the second separator layer can be either organic or inorganic particles as long as it is an electrochemically-stable material that has a heat-resistant temperature of not lower than 150° C., is electrically insulative, stable with respect to the electrolyte or a solvent to be used in production of the separator, and furthermore resistant against oxidation/reduction in an operation voltage range for the electrochemical device. Fine particles are preferred from the viewpoint of dispersibility or the like, and inorganic fine particles are used more preferably from the viewpoint of the stability or the like.

Specific examples of ingredients of the inorganic particles include: inorganic oxides such as an iron oxide, $SiO_2$, $Al_2O_3$, $TiO_2$, $BaTiO_2$, and $ZrO_2$; inorganic nitrides such as aluminum nitride and silicon nitride; hardly-soluble ionic crystals such as calcium fluoride, barium fluoride, and barium sulfate; covalent crystals such as silicon and diamond; and clays such as montmorillonite. Here, the inorganic oxides can be made from mineral resources such as boehmite, zeolite, apatite, kaoline, mullite, spinel, olivine, and mica or artificial products thereof. The particles can be provided with electric insulation by coating the surface of the conductive material such as a metal, conductive oxides such as $SnO_2$ and a tin-indium oxide (ITO), or carbonaceous materials such as carbon black and graphite with an electrically insulative material such as the above-mentioned inorganic oxides. Among the inorganic oxides, $Al_2O_3$, $SiO_2$, and boehmite are preferable, and boehmite, which is most effective in preventing an internal short-circuit caused by formation of lithium dendrite, is used particularly preferably. For the boehmite, synthetic boehmite is used further preferably since it is possible to control the particle diameter and the shape easily and reduce ionic impurities that adversely affect the characteristics of the electrochemical device.

Examples of the organic fine particles (organic powder) include various crosslinked polymer fine particles (that do not correspond to the resin B) such as crosslinked polymethyl methacrylate, crosslinked polystyrene, crosslinked polydivinylbenzene, a crosslinked styrene-divinylbenzene copolymer, polyimide, a melamine resin, a phenol resin, and a benzoguanamine-formaldehyde condensation product; and heat-resistant polymer fine particles such as polypropylene (PP), polysulfone, polyacrylonitrile, aramid, polyacetal, and thermoplastic polyimide. The organic resins (polymers) forming the organic fine particles can be a mixture, a modification, a derivative, a copolymer (a random copolymer, an alternating copolymer, a block copolymer, a graft copolymer), or a crosslinked body of the above-mentioned materials.

The shape of the filler can be substantially spherical or platy, for example. From the viewpoint of prevention of a short-circuit, flakes are preferred. Representative examples of the flakes include plate-like $Al_2O_3$ and plate-like boehmite.

The particle diameter of the filler as the number-average particle diameter obtained through the above-mentioned measuring method is, for example, preferably 0.01 µm or larger, and more preferably 0.1 µm or larger. The particle diameter is preferably 15 µm or smaller, and more preferably 5 µm or smaller.

For improving the effect of preventing an internal short-circuit, the content of the filler is preferably at least 20 vol. %, and more preferably at least 50 vol. % of the entire volume of the whole ingredients of the separator. Preferably, the content of the filler in the whole ingredients of the separator is suppressed not to exceed 80 vol. % for securing the content of the resin A and the resin B in the separator and maintaining the shutdown characteristic.

The second separator layer including the filler as a main ingredient can contain the fibrous material described below, the resin A and the resin B described above, other added particles, and the like. The second separator layer is provided mainly for securing an original function of the separator, i.e., a function of preventing a short-circuit between the positive electrode and the negative electrode as described above. When the second separator layer has a low filler content, it becomes difficult to secure this function. Therefore, the content of the filler in the second separator layer is preferably at least 50 vol. %, more preferably at least 70 vol. %, and further preferably at least 80 vol. % of the entire volume of the whole solid contents (in the case of using the porous base described below, the whole solid contents except this porous base).

Regarding the separator of the present invention, at least one of the first separator layer and the second separator layer includes flakes. In the case where the second separator layer includes flakes, the flakes also can serve as the filler in the second separator layer as described above.

Regarding the form of the flakes, the aspect ratio is preferably in a range of 2 to 100, more preferably not less than 5, and most preferably not less than 10. The aspect ratio is more preferably not more than 50. Further, an average ratio length in the long axis direction/length in the short axis direction) between the length in the long axis direction and the length in the short axis direction of the flat plate surface of the particles is preferably approximate to 1, such as not more than 3, and more preferably not more than 2.

The average ratio between the length in the long axis direction and the length in the short axis direction of the flat plate surface of the flakes can be determined through an analysis of images taken by a scanning electron microscope (SEM), for example. The aspect ratio of the flakes also can be determined through an analysis of images taken by a SEM.

The average particle diameter of the flakes is not limited particularly as long as it is smaller than the thickness of the separator, and it preferably is not less than 1/100 of the thickness of the separator. More specifically, the particle diameter as the number-average particle diameter obtained through the above-mentioned measuring method is, for example, preferably 0.01 μm or larger, and more preferably 0.1 μm or larger. The particle diameter is 15 μm or smaller preferably, and more preferably 5 μm or smaller.

It is preferable that the flakes are present in the separator in a state where the flat plate surfaces are substantially parallel to the surface of the separator. More specifically, regarding the flakes in the vicinity of the surface of the separator, the angle between the flat plate surface and the surface of the separator in average is preferably 30° or less, and most preferably 0°, namely, the flat plate surfaces of the flakes in the vicinity of the surface of the separator are parallel to the surface of the separator. "In the vicinity of the surface" as used herein denotes a range of about 10% of the entire thickness from the surface of the separator. When the flakes are present in the above-described state, it is possible to prevent effectively the occurrence of an internal short-circuit caused by lithium dendrite deposited on the electrode surface or a protrusion of an active material on the electrode surface.

For the material of the flakes, other than the inorganic fine particles (such as plate-like $Al_2O_3$ and plate-like boehmite as representative examples) described as specific examples of the plate-like filler above, a resin material whose heat-resistant temperature is 150° C. or higher can be used as well. Two or more of the ingredients of the flakes can be used together.

For exhibiting more effectively the effects obtained by including the flakes in at least one of the first separator layer and the second separator layer, the content of the flakes is preferably 25% or more, more preferably 40% or more, and further preferably 70% or more of the entire volume of the whole ingredients of the separator (in the case of using the porous base described below, the entire volume of the whole ingredients except this porous base).

It is more preferable that the flakes are included in the second separator layer. It is further preferable that the filler is the flakes in the second separator layer.

The first separator layer and the second separator layer in the separator of the present invention preferably include an organic binder for securing the shape stability of the separator, for example. Though only one of the layers can include the organic binder, it is preferable that both of the layers include the organic binder. Examples of the organic binder include EVA (having 20 to 35 mol % of a structural unit derived from vinyl acetate), ethylene-acrylic acid copolymers such as an ethylene-ethylacrylate copolymer (EEA), fluorine-based rubber, styrene-butadiene rubber (SBR), carboxymethyl cellulose (CMC), hydroxyethyl cellulose (HEC), polyvinyl alcohol (PVA), polyvinyl butyral (PVB), polyvinyl pyrrolidone (PVP), a crosslinked acrylic resin, polyurethane, and an epoxy resin. Particularly, a heat-resistant binder having a heat-resistant temperature of 150° C. or higher is used preferably. One of the above-mentioned materials can be used alone, or alternatively two or more of the materials can be used together for the organic binder.

Among the above-mentioned organic binders, binders with high flexibility such as EVA, ethylene-acrylic acid copolymers, fluorine-based rubber, and SBR are preferable. Specific examples of the organic binder with high flexibility include EVA "EVAFLEX series" manufactured by Du Pont-Mitsui Polychemical Co., Ltd., EVA manufactured by NIPPON UNICAR CO., LTD., an ethylene-acrylic acid copolymer "EVAFLEX-EEA series" manufactured by Du Pont-Mitsui Polychemical Co., Ltd., EEA manufactured by NIPPON UNICAR CO., LTD., fluorocarbon rubber "DAI-EL latex series" manufactured by DAIKIN INDUSTRIES, Ltd., SBR "TRD-2001" manufactured by JSR Corporation, and SBR "BM-400B" manufactured by ZEON Corporation.

When using any of the organic binders, the binder can be dissolved in a solvent of a composition for forming the separator described below. Alternatively, the binder can be used in a dispersed emulsion form.

For securing the shape stability and flexibility of the separator, a fibrous material or the like can be mixed with the filler and the resin A and the resin B. The fibrous material is not limited particularly as long as it has a heat-resistant temperature of 150° C. or higher, and is electrically insulative, stable electrochemically, and also stable with respect to the electrolyte as described below or a solvent to be used in production of the separator. The "fibrous material" in this specification has an aspect ratio Longitudinal length/width (diameter) in a direction crossing the longitudinal direction) of at least 4, and the aspect ratio is at least 10 preferably.

Specific examples of ingredients of the fibrous material include: celluloses and the modifications (carboxy methyl cellulose (CMC), hydroxypropylcellulose (HPC) and the like); polyolefins (polypropylene (PP), a propylene copolymer and the like); polyesters (polyethylene terephthalate (PET), polyethylene naphthalate (PEN), polybutylene terephthalate (PBT) and the like); resins such as polyacrylonitrile (PAN), aramid, polyamide imide and polyimide; and inorganic oxides such as glass, alumina, zirconia and silica. At least two of these ingredients can be used together for the fibrous material. The fibrous material can contain various additives as required. For example, when the fibrous material is a resin, it can contain an antioxidant or the like.

Regarding the separator of the present invention, when the filler is fixed with the organic binder, the second separator layer functions to some extent as a base material of the separator, and thus the handleability is not a significant problem in the case where the separator is integrated with the electrodes. However, in order to improve the handleability in the case where the separator is used as an independent film, it is preferable to use an independent porous base for a base material. The porous base is formed of a sheet as a woven fabric, a nonwoven fabric (including paper) or the like of the fibrous material having a heat-resistant temperature of not lower than 150° C., and a commercially available nonwoven fabric or the like can be used for the porous base. The fine particles of the filler, the resin A and the resin B preferably are contained in the pores of the porous base in a separator of this embodiment. The organic binder can be used for binding the porous base and the fine particles of the filler, the resin A and the resin B.

When the first separator layer and/or the second separator layer in the separator of the present invention is used as an independent film without being integrated with the electrodes, it is preferable to use the porous base for an improved strength and easy handling.

"Heat resistance" of the porous base indicates that a dimensional change caused by softening or the like will not occur substantially, and is evaluated on the basis of whether an upper limit temperature (heat-resistant temperature) at which a change in the length of an object, namely, a rate of shrinkage (shrinkage rate) to the length at room temperature for the porous base, can be kept not to exceed 5% is sufficiently higher than the shutdown temperature. For improving the safety of the electrochemical device after a shutdown, it is preferable that the porous base has a heat-resistant temperature higher than the shutdown temperature by at least 20° C. More specifically, it is preferable that the heat-resistant temperature of the porous base is 150° C. or higher, and more preferably 180° C. or higher. There is no particular limitation on the upper limit of the heat-resistant temperature.

The porous base can be used for the first separator layer that includes the resin A and/or the resin B as a main ingredient, or can be used for the second separator layer that includes the filler as a main ingredient. Alternatively, the porous base can be used for both the first separator layer and the second separator layer. In this case, the first separator layer and the second separator layer can be integrated with each other while sharing one porous base, or alternatively each of the first separator layer and the second separator layer can have its own porous base.

When the separator is formed by using the porous base, it is preferable that a part or the whole of the resin A, the resin B, the filler, the flakes, and the like are present in the pores of the porous base. The separator of this embodiment makes it possible to exhibit the effects of the resin A, the resin B, the filler, the flakes, and the like more effectively.

Though the diameter of the fibrous material (including the fibrous material forming the porous base, other fibrous materials) is not limited particularly as long as it is less than the thickness of the separator, the preferred diameter is in a range of 0.01 to 5 μm, for example. When the diameter is too large, entanglement of the fibrous material becomes insufficient. As a result, when a sheet is formed to provide a porous base, for example, the strength is degraded causing difficulty in handling. When the diameter is too small, the pores in the separator are decreased excessively, and the ionic permeability may be degraded to lower the load performance of the electrochemical device.

It is preferable that the content of the fibrous material in the separator of the present invention is, for example, 10 vol. % or more, and more preferably 20 vol. % or more of the entire volume of the whole ingredients. It is preferable that the content is 90 vol. % or less, and more preferably 80 vol. % or less. It is preferable that the fibrous material is included in the separator in a state where the long axis (axis in the longitudinal direction) has an angle of 30° or less, and more preferably 20° or less in average with respect to the separator face, for example.

When the fibrous material is used for the porous base, it is desirable that the contents of the other ingredients are adjusted so that the percentage of the porous base will be not less than 10 vol. % and not more than 90 vol. % of the entire volume of the whole ingredients of the separator.

It is preferable that the separator of the present invention has a thickness of not less than 3 μm, and more preferably not less than 5 μm from the viewpoint of further improving the effect of preventing a short-circuit of the electrochemical device, securing the strength of the separator, and keeping the handleability. From the viewpoint of further increasing the energy density of the electrochemical device, it is preferable that the separator of the present invention has a thickness of not more than 30 μm, and more preferably not more than 20 μm.

The first separator layer has a thickness of preferably not less than 1 μm, and more preferably not less than 3 μm. The thickness is preferably not more than 15 μm, and more preferably not more than 10 μm. The second separator layer has a thickness of preferably not less than 2 μm, and more preferably not less than 4 μm. The thickness is preferably not more than 30 μm, and more preferably not more than 20 μm.

It is preferable that the porosity of the separator of the present invention is 15% or more, and more preferably 20% or more in a dry state for securing the liquid capacity for the electrolyte and improving the ionic permeability. It is preferable from the viewpoint of securing the separator strength and preventing an internal short-circuit that the porosity of the separator of the present invention is 70% or less, and more preferably 60% or less in a dry state. The porosity P (%) of the separator can be calculated on the basis of the total for the respective ingredients 'i' through the following Equation (10), from the separator thickness, the mass per area, and the density of the ingredient.

$$P = 100 - (\Sigma a_i/\rho_i) \times (m/t) \tag{10}$$

In the equation, $a_i$: rate of the ingredient 'i' expressed with mass %; $\rho_i$: density (g/cm$^3$) of the ingredient 'i'; m: mass per unit area (g/cm$^2$) of the separator; and t: separator thickness (cm).

It is also possible to determine the porosity P (%) of the second separator layer through Equation (10) above, assuming that m is the mass per unit area (g/cm$^2$) of the second separator layer, and t is the thickness (cm) of the second separator layer in Equation (10). The porosity of the second separator layer determined by this method preferably is in a range of 10% to 50% as described above.

In the separator including the resin B, there is no substantial problem if the resin B absorbs the electrolyte and swells to decrease the porosity of the separator a little after assembly of the electrochemical device. The porosity of the separator is 10% or more suitably.

The separator of the present invention preferably has a Gurley value in a range of 10 to 300 sec. The Gurley value is expressed in seconds that air of 100 mL takes to pass through a film under a pressure of 0.879 g/mm$^2$ according to JIS P 8117. When air permeability is too large, the ionic permeability is decreased. When air permeability is too small, the strength of the separator may be decreased. Furthermore, it is preferable that the separator strength is 50 g or more with respect to a piercing strength in the case of using a needle having a diameter of 1 mm. When the piercing strength is too small, a short-circuit caused by piercing in the separator may occur when a dendrite crystal of the lithium is formed.

The shutdown characteristic of the separator of the present invention can be determined based on a change in the internal impedance of the electrochemical device according to the temperature in the presence of the nonaqueous electrolyte, for example. Specifically, the shutdown characteristic can be measured in the following manner: the electrochemical device is put in a thermostatic oven, the temperature is raised from room temperature (25° C.) by 1° C. per minute, and the temperature at which the internal impedance of the electrochemical device increases is calculated. In this case, it is preferable that the internal impedance of the electrochemical device at 150° C. is 5 times or more, and more preferably 10 times or more of the internal impedance at room temperature (25° C.). There is no particular limitation on the upper limit of the internal impedance.

Since the separator of the present invention can be produced without applying intensive stress unlike a conventional separator formed of a porous film of PE, there is little or no residual stress after the production, and thermal shrinkage is less likely to occur also due to the presence of the second separator layer. In addition, in the separator formed by using the porous base as described above, substantially no thermal shrinkage occurs in the porous base, and thus thermal shrinkage can be suppressed more. As described above, according to the separator of the present invention, the safety of the electrochemical device at a high temperature can be improved from the viewpoint of the production method as well.

Regarding the separator of the present invention, the thermal shrinkage rate at 150° C. can be 1% or less by using the above-described constitutions. More specifically, even when the electrochemical device has an internal temperature of about 150° C., substantially no shrinkage occurs in the separator, and thus a short-circuit caused by contact between the positive electrode and the negative electrode can be prevented, resulting in improved safety of the electrochemical device at a high temperature. There is no particular limitation on the lower limit of the thermal shrinkage rate, and the thermal shrinkage rate preferably is as close to 0% as possible. The "thermal shrinkage rate at 150° C." of the separator in this specification denotes a rate of dimension reduction expressed as a percentage, which is determined in the following manner: the separator is introduced into a thermostatic oven, the temperature is raised up to 150° C., and the separator is left to stand for 30 minutes and taken out, followed by comparison in dimension with the separator before being introduced into the thermostatic oven.

For the method of producing the separator of the present invention, any of the methods (a) to (d) below can be used, for example. The production method (a) includes: applying a composition (a liquid composition such as a slurry or the like) for forming a first separator layer containing the resin A and/or the resin B or a composition (a liquid composition such as a slurry or the like) for forming a second separator layer containing a filler that has a heat-resistant temperature of not lower than 150° C. on a porous base; subsequently drying at a predetermined temperature; and applying the other composition, followed by drying at a predetermined temperature. Examples of the porous base used in this case include specifically a porous sheet of a woven fabric formed of at least one kind of fibrous material containing as the ingredients the respective materials as described above, or a nonwoven fabric configured by entangling these fibrous materials with each other. More specific examples include nonwoven fabrics such as paper, a PP nonwoven fabric, a polyester nonwoven fabric (a PET nonwoven fabric, a PEN nonwoven fabric, a PBT nonwoven fabric and the like), and a PAN nonwoven fabric.

The composition for forming the first separator layer contains the resin A and/or the resin B (such as fine particles) and in addition, a filler (that can be flakes), an organic binder, and the like as required, which are dispersed in a solvent (including a dispersion medium, hereinafter, the same). The organic binder may be dissolved in a solvent. The solvent used for the composition for forming the first separator layer is not limited particularly as long as it can disperse the resin A and the resin B, the filler, and the like homogeneously and it can dissolve or disperse the organic binder homogeneously. In general, organic solvents such as aromatic hydrocarbons like toluene, furans like tetrahydrofuran, and ketones like methyl ethyl ketone and methyl isobutyl ketone are used suitably. Alcohols (ethylene glycol, propylene glycol and the like) or various propylene oxide-based glycol ethers or the like such as monomethyl acetate can be added suitably to these solvents in order to control the surface tension. When the organic binder is water soluble, water can be used for the solvent in the case of use as an emulsion. Similarly in this case, alcohols (methyl alcohol, ethyl alcohol, isopropyl alcohol, ethylene glycol and the like) can be added suitably to control the surface tension.

The composition for forming the second separator layer contains the filler (that can be flakes), and in addition the resin A and the resin B (such as fine particles), an organic binder, and the like as required, which are dispersed in a solvent. For the solvent, the same solvents as described for the composition for forming the first separator layer can be used. Further, the ingredients described above for the composition for forming the first separator layer can be added suitably to control the surface tension.

It is preferable in the composition for forming the first separator layer and the composition for forming the second separator layer that the contents of solids including the resin A, the resin B, the filler, and the organic binder are in a range of 10 to 80 mass %, for example.

When the aperture diameter of the pores in the porous base is relatively large, for example, 5 μm or more, this often will result in a short-circuit of the electrochemical device. Therefore, in this case, it is preferable in the structure that the whole or a part of the resin A and the resin B, the filler, the flakes, and the like are present in the pores of the porous base. In order to allow the resin A and the resin B, the filler, the flakes, and the like to be present in the pores of the porous base, the following steps may be used, for example: applying a composition for forming a separator layer containing these materials on the porous base; and removing an extra composition through a predetermined gap, followed by drying.

For improving the orientation of the flakes to be contained in the separator and functioning more effectively, it is possible, for example, that the composition for forming the separator layer containing the flakes is applied on the porous base to be impregnated into the porous base, and the composition is applied with shear or a magnetic field. For example, in the same manner as above, the composition for forming the separator layer containing the flakes are applied on the porous base, and subsequently the composition can be applied with shear through a predetermined gap.

For exhibiting the effects of the respective ingredients such as the resin A and the resin B, the filler, the flakes, and the like more effectively, the ingredients can be distributed unevenly to cohere as a layer parallel or substantially parallel to the film face of the separator. In a method employed for this purpose, for example, two heads or rollers of a die-coater or a reverse roll-coater are used to apply separate compositions, such as the composition for forming the first separator layer and the composition for forming the second separator layer, from both directions, i.e., the surface and the back face, of the porous base separately, followed by drying.

The production method (b) of the separator of the present invention includes: applying the composition for forming the first separator layer or the composition for forming the second separator layer on a porous base; applying the other composition before the composition applied first is dried; and drying.

The production method (c) of the separator of the present invention includes: applying the composition for forming the first separator layer on a porous base; drying to form the first separator layer that includes the resin A and/or the resin B as a main ingredient; applying the composition for forming the second separator layer on another porous base; drying to form the second separator layer that includes, as a main ingredient, a filler that has a heat-resistant temperature of not lower than 150° C.; and overlapping theses two separator layers to form one separator. In this case, the first separator layer and the second separator layer can be integrated with each other. Alternatively, the first separator layer and the second separator layer can be independent and, due to assembly of the electrochemical device, function as an integrated separator in a state where these layers are overlapped in the electrochemical device.

In the production method (d) of the separator of the present invention, a fibrous material is contained further in the composition for forming the first separator layer and the composition for forming the second separator layer as required, which is then applied on a substrate such as a film and a metal foil, dried at a predetermined temperature, and peeled off from this substrate. Also in the method (d), the first separator layer that includes the resin A and/or the resin B as a main ingredient and the second separator layer that includes the filler as a main ingredient can be independent or integrated with each other as in the method (c). In the case where the first separator layer and the second separator layer are integrated with each other, it is possible that one of the separator layers is formed and dried, followed by formation of the other separator layer as in the method (a). Alternatively, it is possible that a composition for forming one separator layer is applied, and a composition for forming the other separator layer is applied before the composition applied first is dried. Alternatively, it is possible to employ so-called simultaneous multi-layer application, where both the compositions for forming the respective separator layers are applied simultaneously.

Alternatively, in the method (d), it is possible to form the first separator layer or the second separator layer on a surface of at least either of the positive electrode and the negative electrode forming the electrochemical device so as to provide a structure where the separator and the electrodes are integrated with each other. In this case, both of the separator layers can be formed on at least either of the positive electrode and the negative electrode. Alternatively, either of the separator layers can be formed on both the electrodes. Alternatively, the first separator layer can be formed on the positive electrode or the negative electrode, and the second separator layer can be formed on the other electrode.

The separator of the present invention will not be limited to the respective structures produced by the above-described methods (a) to (d). For example, the structure can be provided by combining the methods (c) and (d), where a porous base is used for either of the first separator layer and the second separator layer, and a porous base is not used for the other separator layer. Alternatively, it is possible that either of the first separator layer and the second separator layer is integrated with the electrodes, and the other separator layer is independent.

Further, it is not necessarily required that one first separator layer that includes the resin A and/or the resin B as a main ingredient and one second separator layer that includes the filler as a main ingredient are provided. A plurality of these layers can be included in the separator. For example, the first separator layer can be formed on both faces of the second separator layer. However, an increase in the number of layers increases the thickness of the separator, which may result in an increase in the internal impedance and a decrease in the energy density. For this reason, it is not preferable to increase the number of layers excessively, and the number of the separator layers preferably is 5 or less. The resin A and the resin B can be present as particles separately and independently, and the resin A and the resin B can be fused partially to each other or to a fibrous material or the like. In addition to the structure where the first separator layer and the second separator layer are integrated as an independent film to form a separator, it is also possible that each of the first separator layer and the second separator layer is an independent component, and these separator layers are overlapped in the electrochemical device to function as a separator interposed between the positive electrode and the negative electrode when the electrochemical device is assembled. Further, the first separator layer and the second separator layer are not required to be in contact with each other, and another layer, such as a layer of a fibrous material forming the porous base, can be interposed between these layers.

There is no particular limitation on the electrochemical device to which the separator of the present invention is applied as long as a nonaqueous electrolyte is used. The separator preferably can be applied to not only a lithium secondary battery but also to a lithium primary battery, a supercapacitor or the like where safety at a high temperature is required. In other words, the electrochemical device of the present invention is not particularly limited as to the constitution and the structure as long as the separator of the present invention is provided. It is possible to employ various constitutions and structures provided in various conventional electrochemical devices (a lithium secondary battery, a lithium primary battery, a supercapacitor and the like) with a non-aqueous electrolyte.

Hereinafter, application to a lithium secondary battery will be described below as an example of the electrochemical device of the present invention. The lithium secondary battery can be formed, for example, as a cylinder (with or without angles) using a steel can, an aluminum can or the like as an outer package. Alternatively, it can be a soft package battery using as an outer package a metal deposition laminate film.

There is no particular limitation on the positive electrode as long as it is a positive electrode used for a conventional lithium secondary battery, i.e., a positive electrode containing an active material that can occlude and emit the Li ion. For the positive active material, it is possible to use, for example, a lithium-containing transition metal oxide having a layer structure expressed as $Li_{1+x}MO_2$ ($-0.1<x<0.1$; M: Co, Ni, Mn, Al, Mg and the like); a lithium-manganese oxide having a spinel structure such as $LiMn_2O_4$ and an oxide in which a part of the elements of $LiMn_2O_4$ is substituted by another element; and an olivine-type compound expressed as $LiMPO_4$ (M: Co, Ni, Mn, Fe and the like). Specific examples of the lithium-containing transition metal oxide having a layer structure include $LiCoO_2$, $LiNi_{1-x}Co_{x-y}Al_yO_2$ ($0.1 \leq x \leq 0.3$, $0.01 \leq y \leq 0.2$), and also an oxide containing at least Co, Ni and Mn ($LiMn_{1/3}N_{1/3}Co_{1/3}O_2$, $LiMn_{5/12}Ni_{5/12}Co_{1/6}O_2$, $LiMn_{3/5}N_{1/5}Co_{1/5}O_2$ and the like).

To the positive active material, a carbon material such as carbon black as a conductive auxiliary and a fluorine resin such as polyvinylidene fluoride (PVDF) as a binder are added to prepare a positive mixture. This positive mixture is used to form a positive active material-containing layer on a current collector, for example.

For the positive current collector, a foil, a punched metal, a mesh, an expanded metal and the like of metal such as aluminum can be used. In general, an aluminum foil 10 to 30 μm in thickness is used preferably.

A lead portion on the positive electrode side is provided generally by keeping a portion of the current collector as an exposed part without forming the positive active material-containing layer during the production of the positive electrode. However, the lead portion is not necessarily integrated with the current collector at the beginning, but it can be provided by connecting later a foil of aluminum or the like to the current collector.

There is no particular limitation on the negative electrode as long as it is a negative electrode used for a conventional lithium secondary battery, i.e., a negative electrode containing an active material that can occlude and emit the Li ion. The negative active material is carbon-based materials that can occlude and emit lithium, and they can be used alone or combined with at least one of the other materials. Examples include: graphite, pyrolytic carbons, cokes, glassy carbons, a calcined organic polymer compound, mesocarbon microbeads (MCMB), and carbon fibers. Alternative materials that can be used for the negative active material include: metals such as Si, Sn, Ge, Bi, Sb, and In and an alloy thereof, compounds such as a lithium-containing nitride and a lithium-containing oxide that can be charged/discharged at a voltage as low as that of a lithium metal, a lithium metal, and a lithium/aluminum alloy.

A conductive auxiliary (a carbon material such as carbon black) and a binder of PVDF or the like are added suitably to the negative active material for preparing a negative mixture, and this negative mixture is formed into a compact (a negative active material-containing layer) with the current collector as a core for use as the negative electrode. Alternatively, a foil of the above-described various alloys or the lithium metal is used alone, or alternatively the foil is laminated on the current collector for use as the negative electrode.

When the current collector is used for the negative electrode, a foil, a punched metal, a mesh, an expanded metal or the like of copper or nickel can be used for the current collector. In general, a copper foil is used. Regarding the negative current collector, when the entire thickness of the negative electrode is decreased for obtaining a battery of high energy density, preferably the upper limit of the thickness is 30 µm and the lower limit is 5 µm. A lead portion on the negative electrode side can be formed similarly to the lead portion on the positive electrode side.

The electrode used here can be prepared as an electrode laminate formed by overlapping the positive electrode and the negative electrode with the separator of the present invention interposed therebetween, or as a wound electrode laminate formed by winding this electrode laminate.

For the nonaqueous electrolyte, a solution prepared by dissolving lithium salt in an organic solvent is used as described above. The lithium salt is not limited particularly as long as it dissociates in the solvent and forms a Li$^+$ ion while hardly causing any side reaction such as decomposition in a voltage range applied for the battery. Examples include inorganic lithium salts such as $LiClO_4$, $LiPF_6$, $LiBiF_4$, $LiAsF_6$, and $LiSbF_6$; and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, and $LiC_nF_{2n+1}SO_3$ ($2 \leq n \leq 5$), $LiN(RfOSO_2)_2$ (here, Rf denotes a fluoroalkyl group).

The organic solvent used for the nonaqueous electrolyte is not limited particularly as long as it dissolves the lithium salt and does not cause a side reaction such as decomposition in a voltage range applied for the battery. Examples include: cyclic carbonates such as ethylene carbonate, propylene carbonate, butylene carbonate, and vinylene carbonate; chain carbonates such as dimethyl carbonate, diethyl carbonate, and methyl ethyl carbonate; chain esters such as methyl propionate; cyclic esters such as γ-butyrolactone; chain ethers such as dimethoxyethane, diethyl ether, 1,3-dioxolane, diglyme, triglyme, and tetraglyme; cyclic ethers such as dioxane, tetrahydrofuran, and 2-methyltetrahydrofuran; nitryls such as acetonitrile, propionitrile, and methoxypropionitrile; and sulfites such as ethylene glycol sulfite. Any of these solvents can be mixed with at least one of the other solvents in use. For obtaining a battery having more preferable characteristics, use of a combination of solvents for obtaining a high conductance, such as a mixed solvent of ethylene carbonate and a chain carbonate, is preferred. Additives such as vinylene carbonates, 1,3-propanen sultone, diphenyl disulfide, cyclohexane, biphenyl, fluorobenzene, and t-butylbenzene can be added suitably to the electrolytes in order to improve characteristics such as safety, the charging/discharging cyclic performance, and a high-temperature storage characteristic.

It is preferable that the concentration of the lithium salt in the nonaqueous electrolyte is in a range of 0.5 to 1.5 mol/L, and more preferably 0.9 to 1.25 mol/L.

The positive electrode having the positive active material-containing layer and the negative electrode having the negative active material-containing layer as described above are produced in the following manner, for example. A composition (slurry or the like) for forming the positive active material-containing layer that is provided by dispersing a positive mixture in a solvent of N-methyl-2-pyrrolidone (NMP) or the like, and a composition (slurry or the like) for forming the negative active material-containing layer that is provided by dispersing a negative mixture in a solvent of NMP or the like are applied on a current collector, followed by drying. In this case, for example, when the composition for forming the positive active material-containing layer is applied on the current collector, and at least one of the composition for forming the first separator layer and the composition for forming the second separator layer as described above is applied before the composition for forming the positive active material-containing layer is dried, the positive electrode and the first separator layer and/or the second separator layer can be integrated with each other. When the composition for forming the negative active material-containing layer is applied on the current collector, and at least one of the composition for forming the first separator layer and the composition for forming the second separator layer is applied before the composition for forming the negative active material-containing layer is dried, the negative electrode and the first separator layer and/or the second separator layer can be integrated with each other.

The electrochemical device (such as the above-described lithium secondary battery) of the present invention can be produced by integrating the electrodes with the separator layers as described above. Further, the electrochemical device of the present invention can be used in the same applications as those of a conventional electrochemical device.

The present invention will be described in detail below by referring to Examples, though the present invention will not be limited to the following Examples.

The swelling degrees $B_R$ and $B_T$ of the resin B in Examples denote swelling degrees calculated on the basis of Equations (1) to (9) above by the above-described technique. In the case where a porous base (nonwoven fabric) is used, the content of each ingredient in the first separator layer and the second separator layer by volume shown in each of Examples denotes a content by volume in the entire volume of the whole ingredients except the porous base. The melting point (melting temperature) of the resin A and Tg of the resin B shown in each of Examples are measured by using a DSC according to the regulations of JIS K 7121.

Production Example 1

Production of Negative Electrode 95 mass parts of graphite as a negative active material and 5 mass parts of PVDF as a binder were mixed homogeneously in a solvent of NMP so as to prepare a paste containing a negative mixture. This paste containing a negative mixture was applied intermittently on both faces of a copper foil 10 μm in thickness for making a current collector so that the length of the applied active material was 320 mm on the surface and 260 mm on the back face, which was dried subsequently. Later, calendering was carried out for adjusting the thickness of the negative mixture layer so that the entire thickness would be 142 μm, which was then cut to be 45 mm in width, and thus a negative electrode 330 mm in length and 45 mm in width was produced. Further, a tab was welded to an exposed part of the copper foil of this negative electrode so as to form a lead portion.

Production Example 2

Production of Positive Electrode 85 mass parts of LiCoO$_2$ as a positive active material, 10 mass parts of acetylene black as a conductive auxiliary, and 5 mass parts of PVDF as a binder were mixed homogeneously in a solvent of NMP so as to prepare a paste containing a positive mixture. This paste was applied intermittently on both faces of an aluminum foil 15 μm in thickness for making a current collector so that the length of the applied active material was 319 to 320 mm on the surface and 258 to 260 mm on the back face, which was dried subsequently. Later, calendering was carried out for adjusting the thickness of the positive mixture layer so that the entire thickness would be 150 μm, which was then cut to be 43 mm in width, and thus a positive electrode 330 mm in length and 43 mm in width was produced. Further, a tab was welded to an exposed part of the aluminum foil of this positive electrode so as to form a lead portion.

Example 1 an aqueous dispersion (solid content: 40 mass %) [liquid composition (1-A)] of PE fine particles (average particle diameter: 1 μm; melting point: 125° C.) was applied on both faces of the negative electrode produced in Production Example 1 by a blade coater, which was dried subsequently. As a result, a first separator layer based on the PE as resin A was formed to have a thickness of 5 μm. In the same manner, the first separator layer based on the PE fine particles as resin A having a thickness of 5 μm also was formed on both faces of the positive electrode produced in Production Example 2. The first separator layer formed on the positive electrode and the negative electrode was formed only of the PE fine particles as resin A, and thus the content of the resin A in the first separator layer was 100% by volume.

2000 g of an aqueous dispersion (solid content: 40 mass %) of PE fine particles (average particle diameter: 1 μm; melting point: 125° C.) and 800 g of ethanol were introduced into a container and dispersed by stirring with a disperser on the condition of 2800 rpm for one hour. Further, 2400 g of silica (SiO$_2$) fine particles (average particle diameter: 0.4 μm; particle size distribution: 0.3 to 0.7 μm) as a filler and a self-crosslinked acrylic resin emulsion as a binder were added to the dispersion so that the amount of solids of the binder would be 3 mass parts with respect to 100 mass parts of the filler, and the dispersion was stirred for three hours to provide a homogeneous liquid composition (2-A) in a slurry state. In this liquid composition (2-A), a melt-blown nonwoven fabric of PP 15 μm in thickness for making a porous base was introduced, pulled out for applying the liquid composition (2-A), and dried. As a result, a porous film (thickness: 20 μm) based on the silica fine particles was obtained as a second separator layer, and it had the resin A (PE) and the filler (silica fine particles) both being contained in the pores of the nonwoven fabric.

The silica fine particles used in this Example included 25 vol. % of flakes as a result of SEM observation. The content of the silica fine particles in the second separator layer was calculated to be 58% by volume, assuming that the specific gravity of the PE was 1.0 g/cm$^3$, the specific gravity of the silica was 2.2 g/cm$^3$, and the specific gravity of the acrylic resin was 1.2 g/cm$^3$.

The porous film as the second separator layer was wound spirally with the positive electrode having the first separator layer and the negative electrode having the first separator layer to produce a wound electrode laminate. This wound electrode laminate was pressed and flattened to be loaded in a battery container. As a nonaqueous electrolyte, a solution was prepared by dissolving LiPF$_6$ to have a concentration of 1.2 mol/L in a solvent as a mixture of ethylene carbonate and ethyl methyl carbonate at a volume ratio of 1:2. After injection of the nonaqueous electrolyte into the battery, the container was sealed to produce a lithium secondary battery. It should be noted that the separator in this Example indicates a combination of both the first separator layer formed on the positive electrode and the negative electrode and the second separator layer (porous film) including a nonwoven fabric as a base material (this also applies to Examples below).

Example 2

A liquid composition (2-B) was prepared in the same manner as for the liquid composition (2-A) in Example 1 except that the silica fine particles were replaced by 4400 g of plate-like alumina (Al$_2$O$_3$) fine particles (average particle diameter: 2 μm; aspect ratio: 50). The liquid composition (2-B) and the liquid composition (1-A) used in Example 1 were applied simultaneously on both faces of a wetlaid nonwoven fabric (porous base) of PET 18 μm in thickness by using a die-coater with two dies provided at positions opposed to each other, thereby providing a porous film having a first separator layer based on the PE as resin A and a second separator layer based on the plate-like alumina fine particles as a filler. Each of the first separator layer and the second separator layer was about 10 μm in thickness.

The content of the plate-like alumina fine particles in the second separator layer was calculated to be 58% by volume, assuming that the specific gravity of the PE was 1.0 g/cm$^3$, and the specific gravity of the alumina was 4.0 g/cm$^3$.

The negative electrode produced in Production Example 1, the above-described porous film, and the positive electrode produced in Production Example 2 were overlapped so that the second separator layer side of the porous film corresponded to the negative electrode side, and wound spirally to produce a wound electrode laminate. A lithium secondary battery was produced in the same manner as in Example 1 except that this wound electrode laminate was used.

Example 3

1000 g of plate-like boehmite (average particle diameter: 1 μm; aspect ratio: 10) as a filler was dispersed in 1000 g of water, and 120 g of SBR latex as a binder further was added and dispersed homogeneously to prepare a liquid composition (2-C). In the liquid composition (2-C), a melt-blown nonwoven fabric (porous base) of PP 15 μm in thickness was introduced, pulled out for applying the liquid composition (2-C), and dried. As a result, a porous film (thickness: 20 μm)

based on the plate-like boehmite was obtained as a second separator layer, and it had the filler (plate-like boehmite) being contained in the pores of the nonwoven fabric. In the liquid composition (1-A) used in Example 1, this porous film was introduced, pulled out for applying the liquid composition (1-A), and dried. As a result, a porous film having a first separator layer based on the PE fine particles as resin A on both faces of the second separator layer was obtained.

The content of the plate-like boehmite in the second separator layer was calculated to be 87% by volume, assuming that the specific gravity of the SBR was 0.97 g/cm$^3$, and the specific gravity of the boehmite was 3.0 g/cm$^3$.

A lithium secondary battery was produced in the same manner as in Example 2 except that the above-described porous film was used. The separator of this Example alone was heated to 150° C. and cooled to room temperature. Then, in an observation of the cross section of the separator by using a scanning electron microscope, it was confirmed that a thin film formed due to melting of the PE fine particles in the first separator layer was present on a surface of the separator.

Example 4

To the liquid composition (2-C) prepared in Example 3, 330 g of an aqueous dispersion (solid content: 40 mass %) of crosslinked PMMA (average particle diameter: 0.4 μm; $B_R$=0.5; $B_T$=4; Tg: 105° C.) further was added and dispersed homogeneously to provide a liquid composition (2-D).

A porous film having a first separator layer based on the PE fine particles as resin A on both faces of a second separator layer that was based on the plate-like boehmite and further contained the crosslinked PMMA as resin B was obtained in the same manner as in Example 3 except that the liquid composition (2-C) was replaced by the liquid composition (2-D). A lithium secondary battery was produced in the same manner as in Example 2 except that this porous film was used.

The content of the plate-like boehmite in the second separator layer was calculated to be 68% by volume, assuming that the specific gravity of the SBR was 0.97 g/cm$^3$, the specific gravity of the boehmite was 3.0 g/cm$^3$, and the specific gravity of the crosslinked PMMA was 1.2 g/cm$^3$.

Example 5

To 1000 g of an aqueous dispersion (solid content: 40 mass %) of crosslinked PMMA fine particles (average particle diameter: 0.1 μm; $B_R$=1.0; $B_T$=5; Tg: 85° C.) as resin B, 100 g of SBR latex as used in Example 3 as a binder was added and dispersed homogeneously to provide a liquid composition (1-B).

A porous film having a first separator layer based on the crosslinked PMMA fine particles as resin B on both faces of a second separator layer based on the plate-like boehmite was obtained in the same manner as in Example 3 except that the liquid composition (1-A) was replaced by the liquid composition (1-B). A lithium secondary battery was produced in the same manner as in Example 2 except that this porous film was used.

The content of the crosslinked PMMA fine particles in the first separator layer was calculated to be 89% by volume, assuming that the specific gravity of the SBR was 0.97 g/cm$^3$, and the specific gravity of the crosslinked PMMA was 1.2 g/cm$^3$.

Example 6

A liquid composition (2-E) was prepared in the same manner as for the liquid composition (2-C) in Example 3 except that a mixture of plate-like boehmite as used in Example 3 and another plate-like boehmite (average particle diameter: 0.8 μm; aspect ratio: 50) at a mass ratio of 4:1 was used as a filler. In this liquid composition (2-E), a wetlaid nonwoven fabric of PET 15 μm in thickness for making a porous base was introduced, pulled out for applying the liquid composition (2-E), and dried. As a result, a porous film (thickness: 20 μm) based on this plate-like boehmite was obtained as a second separator layer, and it had the filler (plate-like boehmite) being contained in the pores of the nonwoven fabric.

The content of the plate-like boehmite in the second separator layer was calculated to be 87% by volume, assuming that the specific gravity of the SBR was 0.97 g/cm$^3$, and the specific gravity of the boehmite was 3.0 g/cm$^3$.

Further, in the same manner as in Example 1, the liquid composition (1-A) was applied on both faces of the negative electrode produced in Production Example 1, which was dried subsequently. As a result, a first separator layer based on the PE fine particles as resin A was formed.

The above-described negative electrode and the positive electrode produced in Production Example 2 were overlapped through the porous film, and wound spirally to produce a wound electrode laminate. A lithium secondary battery was produced in the same manner as in Example 1 except that this wound electrode laminate was used.

Example 7

1000 g of silica fine particles as used in Example 1 as a filler was dispersed in 1000 g of water, and 120 g of SBR latex as used in Example 3 as a binder further was added and dispersed homogeneously to provide a liquid composition (2-F). In this liquid composition (2-F), a melt-blown nonwoven fabric (porous base) of PP 15 μm in thickness was introduced and pulled out for applying the liquid composition (2-F). Then, before the liquid composition (2-F) was dried, the liquid composition (1-A) was applied by using a die-coater, followed by drying. As a result, a porous film (thickness: 23 μm) having a first separator layer based on the PE fine particles as resin A and a second separator layer based on the silica fine particles (including flakes) as a filler was obtained.

The content of the silica fine particles in the second separator layer was calculated to be 90% by volume, assuming that the specific gravity of the SBR was 0.97 g/cm$^3$, and the specific gravity of the silica was 2.2 g/cm$^3$.

A lithium secondary battery was produced in the same manner as in Example 2 except that the above-described porous film was used.

Example 8

100 g of EVA (having 34 mol % of a structural unit derived from vinyl acetate) as a binder and 6 kg of toluene were introduced into a container and stirred at room temperature until it was dissolved homogeneously. Further, 1 kg of PE fine particles (average particle diameter: 5 μm; melting point: 105° C.) as resin A was added and dispersed by stirring with a disperser on the condition of 2800 rpm for one hour. Further, 1 kg of alumina fine particles (average particle diameter: 0.4 μm) was added and stirred so as to prepare a liquid composition (1-C). The liquid composition (1-C) was applied on both faces of the negative electrode produced in Production Example 1 in the same manner as in Example 1, which was dried subsequently. As a result, a first separator layer that was based on the PE as resin A and further contained the alumina fine particles was formed on the negative electrode to have a thickness of 10 μm.

The content of the PE fine particles in the first separator layer was calculated to be 74% by volume, assuming that the specific gravity of the PE was 1.0 g/cm$^3$, the specific gravity of the EVA was 0.94 g/cm$^3$, and the specific gravity of the alumina was 4.0 g/cm$^3$.

Next, the liquid composition (2-C) was applied on both faces of the positive electrode produced in Production Example 2 by using a blade coater to have a thickness of 10 μm when dried, which was dried subsequently. As a result, a second separator layer based on the plate-like boehmite as a filler was formed on the positive electrode.

The negative electrode on which the first separator layer was formed and the positive electrode on which the second separator layer was formed were overlapped, and wound spirally to produce a wound electrode laminate. A lithium secondary battery was produced in the same manner as in Example 1 except that this wound electrode laminate was used.

Example 9

To 1 kg of the liquid composition (1-A), 400 g of alumina fine particles (average particle diameter: 0.4 μm) further was added and dispersed homogeneously to prepare a liquid composition (1-D).

In the liquid composition (2-D), a wetlaid nonwoven fabric (porous base) of PET 15 μm in thickness was introduced and pulled out for applying the liquid composition (2-D). Then, before the liquid composition (2-D) was dried, the liquid composition (1-D) further was applied by using a die-coater, followed by drying. As a result, a porous film (thickness: 20 μm) having a first separator layer that was based on the PE fine particles as resin A and further contained the alumina fine particles and a second separator layer that was based on the plate-like boehmite and further contained the crosslinked PMMA as resin B was obtained.

The content of the PE fine particles in the first separator layer was calculated to be 80% by volume, assuming that the specific gravity of the PE was 1.0 g/cm$^3$, and the specific gravity of the alumina was 4.0 g/cm$^3$.

A lithium secondary battery was produced in the same manner as in Example 2 except that the above-described porous film was used.

Example 10

1 kg of alumina fine particles (average particle diameter: 0.3 μm) was dispersed in 1 kg of water so as to prepare a slurry. To this slurry, 100 g of a self-crosslinked acrylic resin emulsion (solid content: 45 mass %) as a binder further was added and stirred so as to prepare a liquid composition (2-G).

The liquid composition (2-G) was applied on both faces of the negative electrode produced in Production Example 1 by a blade coater, which was dried subsequently. As a result, a second separator layer based on the alumina fine particles as a filler was formed to have a thickness of 5 μm.

The content of the alumina fine particles in the second separator layer was calculated to be 87% by volume, assuming that the specific gravity of the binder was 1.2 g/cm$^3$, and the specific gravity of the alumina was 4 g/cm$^3$.

To 1 kg of the liquid composition (1-A), 1 kg of plate-like boehmite as used in Example 3 further was added and dispersed homogeneously to prepare a liquid composition (1-E). In this liquid composition (1-E), a melt-blown nonwoven fabric (porous base) of PP 15 μm in thickness was introduced, pulled out for applying the liquid composition (1-E), and dried. As a result, a porous film (thickness: 20 μm) based on the PE fine particles was obtained as a first separator layer, and it had the resin A (PE fine particles) and the flakes (plate-like boehmite) being contained in the pores of the nonwoven fabric.

The contents of the PE fine particles and the plate-like boehmite in the first separator layer were calculated to be 55% and 45%, respectively, by volume, assuming that the specific gravity of the PE was 1.0 g/cm$^3$, and the specific gravity of the boehmite was 3.0 g/cm$^3$.

The above-described negative electrode and the positive electrode produced in Production Example 2 were overlapped through the porous film, and wound spirally to produce a wound electrode laminate. A lithium secondary battery was produced in the same manner as in Example 1 except that this wound electrode laminate was used.

Example 11

In the liquid composition (2-C), a wetlaid nonwoven fabric (porous base) of PET 15 μm in thickness was introduced, pulled out for applying the liquid composition (2-C), and dried. As a result, a porous film (thickness: 20 μm) based on the plate-like boehmite was obtained as a second separator layer, and it had the filler (plate-like boehmite) being contained in the pores of the nonwoven fabric.

To 1 kg of an aqueous dispersion (solid content: 40 mass %) of crosslinked PMMA (average particle diameter: 0.1 μm; $B_T$=1.0; $B_R$=5; Tg: 85° C.) as resin B, 100 g of SBR latex as used in Example 3 as a binder was added and stirred so as to prepare a liquid composition (1-F). This liquid composition (1-F) was applied on both faces of the positive electrode produced in Production Example 2 by using a blade coater, which was dried subsequently. As a result, a first separator layer based on the crosslinked PMMA fine particles as resin B was formed to have a thickness of 6 μm.

The content of the crosslinked PMMA fine particles in the first separator layer was calculated to be 89% by volume, assuming that the specific gravity of the SBR was 0.97 g/cm$^3$, and the specific gravity of the crosslinked PMMA was 1.2 g/cm$^3$.

The negative electrode produced in Production Example 1 and the positive electrode on which the first separator layer was formed were overlapped through the porous film, and wound spirally to produce a wound electrode laminate. A lithium secondary battery was produced in the same manner as in Example 1 except that this wound electrode laminate was used.

Example 12

A porous film (thickness: 20 μm; porous film 1) based on the PE fine particles as resin A was obtained as a first separator layer in the same manner as in Example 10 except that the liquid composition (1-A) was used. Further, a porous film (thickness: 20 μm; porous film 2) based on the plate-like boehmite was obtained as a second separator layer by using the liquid composition (2-C) in the same manner as in Example 11.

The positive electrode produced in Production Example 2 and the negative electrode produced in Production Example 1 were overlapped with the porous film 1 and the porous film 2 interposed therebetween so that the porous film 2 was on the negative electrode side, and wound spirally to obtain a wound electrode laminate. A lithium secondary battery was produced in the same manner as in Example 1 except that this wound electrode laminate was used.

Example 13

A porous film 3 that was based on the PE fine particles as resin A and further contained the alumina fine particles was made as a first separator layer in the same manner as for the porous film 1 in Example 12 except that the liquid composition (1-A) was replaced by the liquid composition (1-D). Further, a porous film 4 that was based on the plate-like boehmite and further contained the crosslinked PMMA fine particles as resin B was made as a second separator layer in the same manner as for the porous film 2 in Example 12 except that the liquid composition (2-C) was replaced by the liquid composition (2-D).

The positive electrode produced in Production Example 2 and the negative electrode produced in Production Example 1 were overlapped with the porous film 3 and the porous film 4 interposed therebetween so that the porous film 4 was on the negative electrode side, and wound spirally to obtain a wound electrode laminate. A lithium secondary battery was produced in the same manner as in Example 1 except that this wound electrode laminate was used.

Example 14

To 1 kg of plate-like alumina (average particle diameter: 2 μm; aspect ratio: 50), 1 kg of water and 100 g of an emulsion of EVA (having 20 mol % of a structural unit derived from vinyl acetate; solid content: 50 mass %) as a binder were added and dispersed by stirring with a disperser on the condition of 2800 rpm for one hour. Further, 300 g of alumina fibers (average fiber diameter: 3 μm; average fiber length: 10 cm) was added and stirred to be homogenized at room temperature so as to obtain a liquid composition (2-H). The liquid composition (2-H) was applied on a PET base by using a die-coater to have a thickness of 50 μm, dried, and peeled off from the PET base, so that a porous film (thickness: 15 μm) based on the plate-like alumina as a filler was obtained as a second separator layer.

The content of the plate-like alumina in the second separator layer was calculated to be 66% by volume, assuming that the specific gravity of the EVA was 0.94 g/cm$^3$, and the specific gravity of the alumina was 4.0 g/cm$^3$.

Further, a first separator layer that was based on the PE fine particles as resin A and further contained the alumina fine particles was formed on the negative electrode to have a thickness of 10 μm by using the liquid composition (1-C) in the same manner as in Example 8.

The negative electrode having the first separator layer, the above-described porous film, and the positive electrode produced in Production Example 2 were overlapped, and wound spirally to provide a wound electrode laminate. A lithium secondary battery was produced in the same manner as in Example 1 except that this wound electrode laminate was used.

Example 15

The liquid composition (2-H) was applied on a PET base in the same manner as in Example 14. Before the liquid composition (2-H) was dried, the liquid composition (1-A) further was applied by using a blade coater to have a thickness of 15 μm, followed by drying. Then, they were peeled off from the PET base, so that a porous film having a first separator layer based on the PE fine particles as resin A and a second separator layer based on the plate-like alumina as a filler was obtained.

The positive electrode produced in Production Example 2 and the negative electrode produced in Production Example 1 were overlapped through the porous film so that the second separator layer was on the negative electrode side, and wound spirally to provide a wound electrode laminate. A lithium secondary battery was produced in the same manner as in Example 1 except that this wound electrode laminate was used.

Comparative Example 1

A lithium secondary battery was produced in the same manner as in Example 12 except that only the porous film 2 made in Example 12 was used as a separator.

Comparative Example 2

A lithium secondary battery was produced in the same manner as in Example 12 except that only the porous film 1 made in Example 12 was used as a separator.

Comparative Example 3

The negative electrode produced in Production Example 1 and the positive electrode produced in Production Example 2 were overlapped with a microporous film (thickness: 20 μm) of PE interposed therebetween, and wound spirally to produce a wound electrode laminate. A lithium secondary battery was produced in the same manner as in Example 1 except that this wound electrode laminate was used.

Tables 1 and 2 show the constitutions of the separators in Examples 1-15 and Comparative Examples 1-3. In Tables 1 and 2, the porosity is calculated on the basis of Equation (10) above, and "resin volume/pore volume" denotes the ratio (%) of the total volume of resin A and resin B included in the first separator layer to the volume of pores of the second separator layer that is assumed to be 100%. Regarding the constitution of each of the layers, the porous base (nonwoven fabric) and the binder are omitted, and an average particle diameter is shown except where specifically noted, and otherwise, the size is shown with its average value.

TABLE 1

|  | First separator layer | | Second separator layer | |
| --- | --- | --- | --- | --- |
|  | Constitution | Resin volume/ pore volume (%) | Constitution | Porosity (%) |
| Example 1 | PE fine particles (1 μm) | 100 | Silica (0.4 μm) PE fine particles (1 μm) | 25 |
| Example 2 | PE fine particles (1 μm) | 143 | Alumina (2 μm; aspect ratio: 50) PE fine particles (1 μm) | 35 |
| Example 3 | PE fine particles (1 μm) | 93 | Boehmite (1 μm; aspect ratio: 10) | 27 |

TABLE 1-continued

| | First separator layer | | Second separator layer | |
|---|---|---|---|---|
| | Constitution | Resin volume/ pore volume (%) | Constitution | Porosity (%) |
| Example 4 | PE fine particles (1 μm) | 89 | Boehmite (1 μm; aspect ratio: 10) Crosslinked PMMA (0.4 μm) | 28 |
| Example 5 | Crosslinked PMMA (0.1 μm) | 93 | Boehmite (1 μm; aspect ratio: 10) | 27 |
| Example 6 | PE fine particles (1 μm) | 38 | Boehmite (1 μm; aspect ratio: 10) Boehmite (0.8 μm; aspect ratio: 50) | 33 |
| Example 7 | PE fine particles (1 μm) | 72 | Silica (0.4 μm) | 27 |
| Example 8 | PE fine particles (5 μm) Alumina (0.4 μm) | 100 | Boehmite (1 μm; aspect ratio: 10) | 40 |
| Example 9 | PE fine particles (1 μm) Alumina (0.4 μm) | 56 | Boehmite (1 μm; aspect ratio: 10) Crosslinked PMMA (0.4 μm) | 28 |

TABLE 2

| | First separator layer | | Second separator layer | |
|---|---|---|---|---|
| | Constitution | Resin volume/ pore volume (%) | Constitution | Porosity (%) |
| Example 10 | PE fine particles (1 μm) Boehmite (1 μm; aspect ratio: 10) | 275 | Alumina (0.3 μm) | 40 |
| Example 11 | Crosslinked PMMA (0.1 μm) | 56 | Boehmite (1 μm; aspect ratio: 10) | 27 |
| Example 12 | PE fine particles (1 μm) | 185 | Boehmite (1 μm; aspect ratio: 10) | 27 |
| Example 13 | PE fine particles (1 μm) Alumina (0.4 μm) | 143 | Boehmite (1 μm; aspect ratio: 10) Crosslinked PMMA (0.4 μm) | 28 |
| Example 14 | PE fine particles (5 μm) Alumina (0.4 μm) | 53 | Alumina (2 μm; aspect ratio: 50) Alumina (diameter: 3 μm; fiber length: 10 cm) | 50 |
| Example 15 | PE fine particles (1 μm) | 53 | Alumina (2 μm; aspect ratio: 50) Alumina (diameter: 3 μm; fiber length: 10 cm) | 50 |
| Comparative Example 1 | None | — | Boehmite (1 μm; aspect ratio: 10) | 27 |
| Comparative Example 2 | PE fine particles (1 μm) | — | None | — |
| Comparative Example 3 | PE microporous film | | | |

Each of the lithium secondary batteries in Examples 1-15 and Comparative Examples 1-3 was evaluated as follows.

First, regarding the lithium secondary batteries in Examples 1-15 and Comparative Examples 1 and 3, the shutdown temperatures of the separators used in the respective batteries were calculated by the following method. The batteries were introduced into a thermostatic oven and heated by raising the temperature from 30° C. to 150° C. by 1° C. per minute, whereby the internal impedance of the batteries was measured according to the temperature. The shutdown temperature was determined as a temperature at which the impedance was raised to be 5 times or more of the value at 30° C. Further, the surface temperatures and the voltages of the batteries were measured after the temperature that had reached 150° C. was maintained for 30 minutes.

Regarding the battery in Comparative Example 2, a change in the internal impedance according to the temperature was measured in the similar manner, but it was found that an internal short-circuit had occurred during production of the battery, and thus an evaluation result for the battery was not obtained. It is considered that since the separator in Comparative Example 2 had no second separator layer containing a filler, the resistance to pressure from both faces was poor, and thus an internal short-circuit occurred by pressing the positive electrode and the negative electrode against each other during production of the battery.

Figure 2:
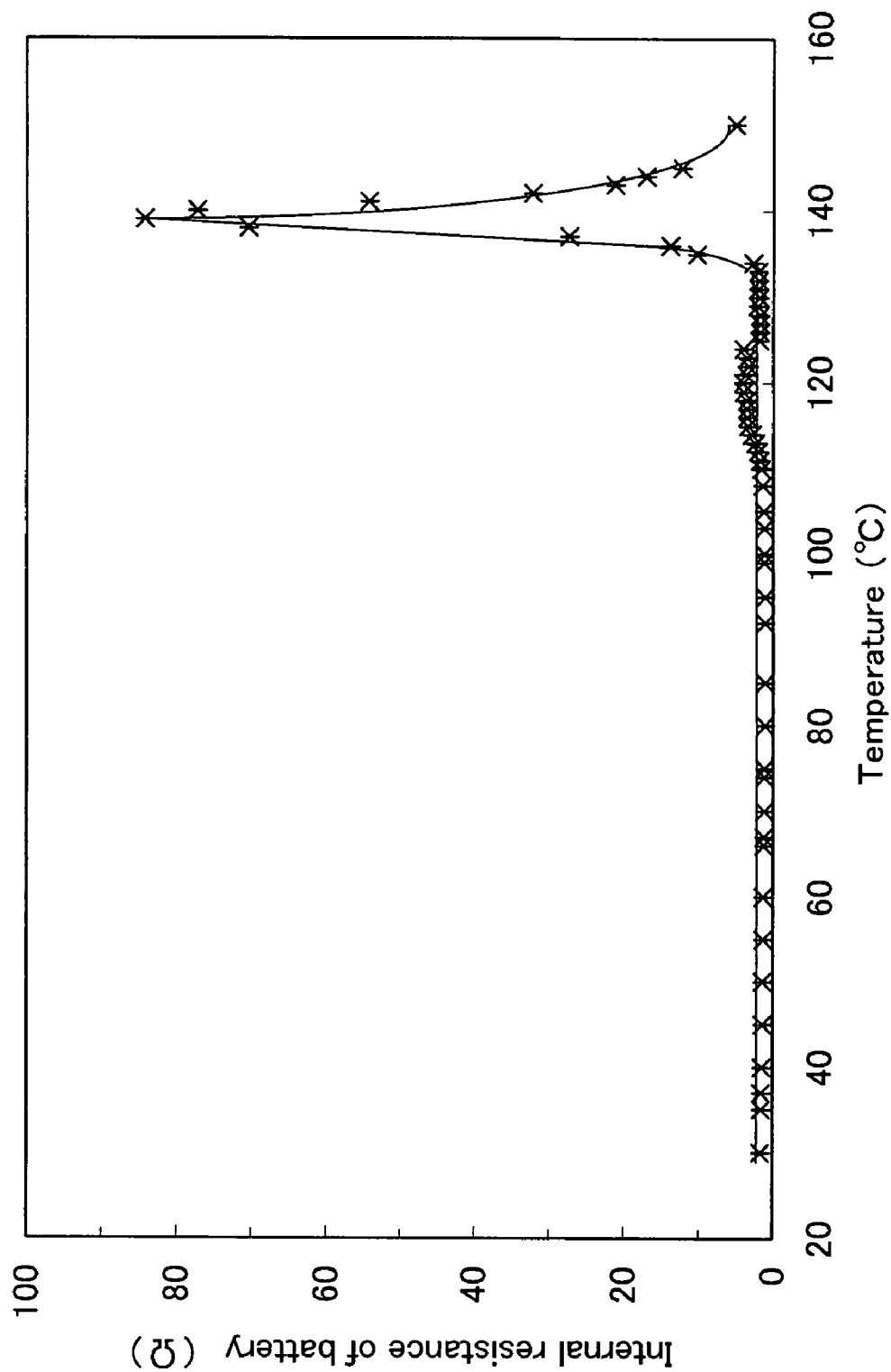
FIG. 2 is a graph showing the internal impedance that changes according to the temperature in a lithium secondary battery in Comparative Example 3.

The evaluation results are shown in Table 3. Further, changes in the internal impedance of the batteries in Example 3 and Comparative Example 3 according to the temperature are shown in FIGS. 1 and 2.

TABLE 3

| | Shutdown temperature (° C.) | After temperature was maintained at 150° C. for 30 minutes |
|---|---|---|
| Example 1 | 122 | Normal |
| Example 2 | 122 | Normal |
| Example 3 | 122 | Normal |
| Example 4 | 122 | Normal |
| Example 5 | 135 | Normal |
| Example 6 | 122 | Normal |

TABLE 3-continued

| | Shutdown temperature (° C.) | After temperature was maintained at 150° C. for 30 minutes |
|---|---|---|
| Example 7 | 122 | Normal |
| Example 8 | 105 | Normal |
| Example 9 | 122 | Normal |
| Example 10 | 122 | Normal |
| Example 11 | 135 | Normal |
| Example 12 | 122 | Normal |
| Example 13 | 122 | Normal |
| Example 14 | 105 | Normal |
| Example 15 | 122 | Normal |
| Comparative Example 1 | — | Increase of surface temperature |
| Comparative Example 3 | 137 | Voltage drop |

Table 3 shows that, regarding the separators in Examples 1-15, the shutdown temperatures are in a range of 105° C. to 135° C., namely, a shutdown occurs in a temperature range suitable for securing the safety of the battery at a high temperature. Moreover, after the temperature was maintained at 150° C. for 30 minutes, an abnormality such as an increase of a surface temperature of the battery and a voltage drop was not observed for the batteries in Examples 1-15.

As shown in FIG. 1, for the battery in Example 3, the shutdown state was retained without decreasing the internal impedance even after the temperature was maintained at 150° C. for 30 minutes, and thus the safety after the shutdown was maintained.

On the other hand, for the separator in Comparative Example 1, no shutdown occurred because the separator had neither resin A nor resin B for securing the shutdown function. Further, the surface temperature of the battery was raised abnormally after the temperature was maintained at 150° C. for 30 minutes. This it thought to be because the shutdown did not function.

As shown in FIG. 2, for the battery in Comparative Example 3, the internal impedance was dropped abruptly when the temperature was maintained at 150° C. for 30 minutes, resulting in a condition where an internal short-circuit might occur easily. This is thought to be due to shrinkage of the separator. Moreover, as shown in Table 3, for the battery in Comparative Example 3, an abnormality, i.e., a drop in battery voltage was observed when the temperature was maintained at 150° C. for 30 minutes.

Furthermore, regarding the lithium secondary batteries in Examples 1-15 and Comparative Example 3, charging was carried out on the condition below, the charging capacities and the discharging capacities were measured respectively, and the rates of the discharging capacities to the charging capacities were evaluated as the charging efficiencies. For the charging, 'constant current'-'constant voltage' charging was employed. Namely, a constant current charging was conducted with a current value of 0.2 C until the battery voltage reached 4.2 V, and subsequently a constant voltage charging was conducted with a voltage value of 4.2 V The total charging time by the time of finishing the charging was 15 hours. The charged batteries were discharged at a discharging current of 0.2 C by the time that the battery voltages became 3.0 V. As a result, the batteries in Examples 1-15 had charging efficiencies of substantially 100% similarly to the battery in Comparative Example 3, and formation of lithium dendrite at the time of charging was suppressed. Thus, it was confirmed that the batteries operated favorably.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

INDUSTRIAL APPLICABILITY

As described above, according to the present invention, an electrochemical device, which is excellent in reliability with respect to an internal short-circuit caused by various causes and in safety when the battery temperature rises abnormally due to a short-circuit or overcharge, can be provided.

The invention claimed is:

1. A separator for an electrochemical device, comprising a porous first separator layer and a porous second separator layer,
  wherein the first separator layer comprises 50 vol. % or more of at least one kind of resin selected from the group consisting of resin A that melts when being heated to a melting point thereof or higher, and resin B that absorbs a nonaqueous electrolyte and swells due to heating and whose swelling degree is increased as the temperature rises,
  the second separator layer comprises 50 vol. % or more of a filler that has a heat-resistant temperature of not lower than 150° C.,
  a total volume of the resin A and the resin B included in the first separator layer is not less than 50% of an entire volume of pores of the second separator layer.

2. The separator for an electrochemical device according to claim 1, wherein the resin A is at least one resin selected from the group consisting of polyethylene, an ethylene-vinyl monomer copolymer, and a polyolefin wax.

3. The separator for an electrochemical device according to claim 1, wherein the resin B is a crosslinked resin having a glass transition point in a range of 75° C. to 125° C.

4. The separator for an electrochemical device according to claim 3, wherein the resin B is at least one crosslinked body of resin selected from the group consisting of a styrene resin, styrene-butadiene rubber, an acrylic resin, a polyalkylene oxide, a fluororesin, and a derivative thereof.

5. The separator for an electrochemical device according to claim 1, wherein a swelling degree $B_R$ of the resin B at 25° C., which is expressed with the equation below, is not more than 1:

$$B_R = (V_0/V_i) - 1$$

where $V_0$ denotes the volume (cm$^3$) of the resin B after being dipped in the nonaqueous electrolyte at 25° C. for 24 hours, and $V_i$ denotes the volume (cm$^3$) of the resin B before being dipped in the nonaqueous electrolyte.

6. The separator for an electrochemical device according to claim 1, wherein a swelling degree $B_T$ of the resin B at 120° C., which is expressed with the equation below, is not less than 1:

$$B_T = (V_1/V_0) - 1$$

where $V_0$ denotes the volume (cm$^3$) of the resin B after being dipped in the nonaqueous electrolyte at 25° C. for 24 hours, and $V_1$ denotes the volume (cm$^3$) of the resin B after being dipped in the nonaqueous electrolyte at 25° C. for 24 hours, followed by steps of raising the temperature of the nonaqueous electrolyte to 120° C. and keeping the nonaqueous electrolyte at 120° C. for one hour.

7. The separator for an electrochemical device according to claim 1, wherein the resin A and the resin B are fine particles.

8. The separator for an electrochemical device according to claim 1, wherein the second separator layer has a porosity in a range of 10% to 50%.

9. The separator for an electrochemical device according to claim 1, wherein the filler that has a heat-resistant temperature of not lower than 150° C. comprises an inorganic oxide.

10. The separator for an electrochemical device according to claim 9, wherein the inorganic oxide comprises at least one oxide selected from the group consisting of boehmite, $Al_2O_3$, and $SiO_2$.

11. The separator for an electrochemical device according to claim 1, wherein the filler that has a heat-resistant temperature of not lower than 150° C. comprises flakes.

12. The separator for an electrochemical device according to claim 11, wherein the flakes have an aspect ratio in a range of 5 to 100.

13. The separator for an electrochemical device according to claim 11, wherein the flakes comprise plate-like boehmite.

14. The separator for an electrochemical device according to claim 1, wherein at least one of the first separator layer and the second separator layer comprises an organic binder.

15. The separator for an electrochemical device according to claim 1, wherein at least one of the first separator layer and the second separator layer further comprises a porous base that has a heat-resistant temperature of not lower than 150° C.

16. The separator for an electrochemical device according to claim 15, wherein the first separator layer and the second separator layer are integrated with each other while sharing the porous base.

17. The separator for an electrochemical device according to claim 15, wherein the porous base is formed of a fibrous material.

18. The separator for an electrochemical device according to claim 17, wherein the fibrous material is at least one material selected from the group consisting of cellulose and a modification thereof, polyolefin, polyester, polyacrylonitrile, aramid, polyamide imide, polyimide, and an inorganic oxide.

19. The separator for an electrochemical device according to claim 15, wherein the porous base is a woven fabric or a nonwoven fabric.

20. The separator for an electrochemical device according to claim 1, wherein the separator for an electrochemical device has a thermal shrinkage rate of not more than 1% at 150° C.

21. A method for producing the separator for an electrochemical device according to claim 1, comprising the steps of:
preparing a composition in a slurry state for forming a first separator layer that comprises at least one kind of resin selected from the group consisting of resin A that melts when being heated to a melting point thereof or higher, and resin B that absorbs a nonaqueous electrolyte and swells due to heating and whose swelling degree is increased as the temperature rises;
preparing a composition in a slurry state for forming a second separator layer that comprises a filler that has a heat-resistant temperature of not lower than 150° C.;
applying the composition for forming the first separator layer on a porous base so as to form the first separator layer that comprises, as a main ingredient, at least one kind of resin selected from the group consisting of the resin A and the resin B; and
applying the composition for forming the second separator layer on the porous base so as to form the second separator layer that comprises, as a main ingredient, the filler.

22. The method for producing the separator for an electrochemical device according to claim 21, wherein either one of the composition for forming the first separator layer and the composition for forming the second separator layer is applied on a porous base, and the other composition is applied on the porous base before the composition applied first is dried.

23. A method for producing the separator for an electrochemical device according to claim 1, comprising the steps of:
preparing a composition in a slurry state for forming a first separator layer that comprises at least one kind of resin selected from the group consisting of resin A that melts when being heated to a melting point thereof or higher, and resin B that absorbs a nonaqueous electrolyte and swells due to heating and whose swelling degree is increased as the temperature rises;
preparing a composition in a slurry state for forming a second separator layer that comprises a filler that has a heat-resistant temperature of not lower than 150° C.;
applying the composition for forming the first separator layer on a first porous base so as to form the first separator layer that comprises, as a main ingredient, at least one kind of resin selected from the group consisting of the resin A and the resin B; and
applying the composition for forming the second separator layer on a second porous base so as to form the second separator layer that comprises, as a main ingredient, the filler.

24. The method for producing the separator for an electrochemical device according to claim 23, wherein the first separator layer and the second separator layer are overlapped in an electrochemical device to form a separator.

25. The separator for an electrochemical device according to claim 1,
wherein the first separator layer is a porous layer that causes a shutdown in a temperature range of 105° C. to 135° C.

26. The separator for an electrochemical device according to claim 1, wherein a content of the filler that has a heat-resistant temperature of not lower than 150° C. is at least 70 vol. % of whole solid contents.

27. The separator for an electrochemical device according to claim 1, wherein the filler that has a heat-resistant temperature of not lower than 150° C. has a number-average particle diameter of 0.01 μm or larger and 15 μm or smaller.

28. The separator for an electrochemical device according to claim 1, wherein a porosity is 15% or more and 70% or less.

29. The separator for an electrochemical device according to claim 1, wherein the first separator layer has a thickness of not less than 3 μm and not more than 20 μm.

30. The separator for an electrochemical device according to claim 1, wherein the second separator layer has a thickness of not less than 2 μm and not more than 20 μM.

31. The separator for an electrochemical device according to claim 1, wherein a thickness is not less than 5 μm and not more than 30 μm.

32. The separator for an electrochemical device according to claim 1, wherein a Gurley value is in a range of 10 to 300 sec.

33. The separator for an electrochemical device according to claim 1, wherein at least one of the first separator layer and the second separator layer comprises flakes.

34. The separator for an electrochemical device according to claim 33, wherein flat plate surfaces of the flakes are substantially parallel to the surface of the separator.

35. The separator for an electrochemical device according to claim 1, wherein a total volume of the resin A and the resin B is not more than 80% of an entire volume of all of the components of the separator.

36. The separator for an electrochemical device according to claim 1, wherein the melting point of the resin A is in a range of 80 to 130° C.

37. An electrochemical device comprising a positive electrode, a negative electrode, a nonaqueous electrolyte, and a porous separator,
  wherein the separator comprises a first separator layer and a second separator layer,
  the first separator layer comprises 50 vol. % or more of at least one kind of resin selected from the group consisting of resin A that melts when being heated to a melting point thereof or higher, and resin B that absorbs the nonaqueous electrolyte and swells due to heating and whose swelling degree is increased as the temperature rises,
  the second separator layer comprises 50 vol. % or more of a filler that has a heat-resistant temperature of not lower than 150° C.,
  a total volume of the resin A and the resin B included in the first separator layer is not less than 50% of an entire volume of pores of the second separator layer.

38. The electrochemical device according to claim 37, wherein at least one of the first separator layer and the second separator layer is integrated with at least one of the positive electrode and the negative electrode.

39. The electrochemical device according to claim 37, wherein an internal impedance at 150° C. is 5 times or more of an internal impedance at 25° C. in the presence of the nonaqueous electrolyte.

40. A method for producing the electrochemical device according to claim 37, comprising the steps of:
  preparing a composition in a slurry state for forming a first separator layer that comprises at least one kind of resin selected from the group consisting of resin A that melts when being heated to a melting point thereof or higher, and resin B that absorbs a nonaqueous electrolyte and swells due to heating and whose swelling degree is increased as the temperature rises;
  preparing a composition in a slurry state for forming a second separator layer that comprises a filler that has a heat-resistant temperature of not lower than 150° C.;
  preparing a composition for forming an active material-containing layer; and
  applying the composition for forming the active material-containing layer on a current collector, and applying the composition for forming the first separator layer or the composition for forming the second separator layer before the applied composition for forming the active material-containing layer is dried, thereby forming the first separator layer that comprises, as a main ingredient, at least one kind of resin selected from the group consisting of the resin A and the resin B or the second separator layer that comprises, as a main ingredient, the filler.

41. The separator for an electrochemical device according to claim 37, wherein at least one of the first separator layer and the second separator layer comprises flakes.

* * * * *